United States Patent
Hayashi et al.

(10) Patent No.: US 10,120,758 B2
(45) Date of Patent: Nov. 6, 2018

(54) INFORMATION PROCESSING SYSTEM, INFORMATION PROCESSING APPARATUS, AND INFORMATION PROCESSING METHOD FOR IMPLEMENTING A SYSTEM ROLLBACK PROCESS

(71) Applicants: Yuuichiroh Hayashi, Kanagawa (JP); Kazunori Sugimura, Kanagawa (JP); Kohsuke Namihira, Kanagawa (JP); Dongzhe Zhang, Tokyo (JP)

(72) Inventors: Yuuichiroh Hayashi, Kanagawa (JP); Kazunori Sugimura, Kanagawa (JP); Kohsuke Namihira, Kanagawa (JP); Dongzhe Zhang, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 54 days.

(21) Appl. No.: 15/062,383

(22) Filed: Mar. 7, 2016

(65) Prior Publication Data
US 2016/0266977 A1  Sep. 15, 2016

(30) Foreign Application Priority Data

| Mar. 10, 2015 | (JP) | 2015-046784 |
| Mar. 10, 2015 | (JP) | 2015-046785 |
| Jan. 8, 2016 | (JP) | 2016-002380 |

(51) Int. Cl.
*G06F 11/14* (2006.01)

(52) U.S. Cl.
CPC ...... *G06F 11/1402* (2013.01); *G06F 11/1469* (2013.01); *G06F 11/1446* (2013.01);
(Continued)

(58) Field of Classification Search
CPC ............. G06F 2201/84; G06F 9/466; G06F 17/30371; G06F 11/1446; G06F 11/1474; G06F 11/1458; G06F 11/1469
See application file for complete search history.

(56) References Cited

U.S. PATENT DOCUMENTS 5,590,277 A * 12/1996 Fuchs ............... G06F 11/1438
  714/16
5,642,504 A *  6/1997 Shiga ............... G06F 11/3688
(Continued)

FOREIGN PATENT DOCUMENTS

| JP | H08-317106 | 11/1996 |
| JP | 2002-297945 | 10/2002 |

(Continued)

*Primary Examiner* — Joseph O Schell
(74) *Attorney, Agent, or Firm* — IPUSA, PLLC

(57) ABSTRACT

An information processing system includes a storage unit storing application identification information of an application for executing a first process in association with information relating to the first process; a receiving unit that receives a request including the application identification information and information relating to electronic data from a device; a process execution unit that executes the first process on electronic data based on the information relating to the first process stored in association with the application identification information included in the request and the information relating to the electronic data included in the request; and a process generation unit that generates information relating to a second process for rolling back a processing result of the first process executed by the process execution unit. The process execution unit executes the second process based on the generated information relating to the second process when an error occurs in the first process.

18 Claims, 39 Drawing Sheets

1371

| OPERATION | RESTORATION OPERATION |
|---|---|
| create Folder | delete Folder |
| move Folder | move Folder |
| upload File | upload File |
| ... | ... |

(52) U.S. Cl.
CPC ...... *G06F 11/1458* (2013.01); *G06F 11/1474* (2013.01); *G06F 2201/80* (2013.01)

(56) References Cited

U.S. PATENT DOCUMENTS

| | | | | |
|---|---|---|---|---|
| 6,751,711 | B1* | 6/2004 | de Buda | G06F 12/1466 |
| | | | | 710/244 |
| 7,467,378 | B1* | 12/2008 | Sobel | G06F 9/44505 |
| | | | | 717/168 |
| 7,620,785 | B1* | 11/2009 | Coulter | G06F 11/1471 |
| | | | | 711/161 |
| 8,903,779 | B1* | 12/2014 | Holenstein | G06F 11/1469 |
| | | | | 707/685 |
| 9,069,516 | B2 | 6/2015 | Sugimura et al. | |
| 2004/0060044 | A1* | 3/2004 | Das | G06F 8/65 |
| | | | | 717/171 |
| 2005/0022177 | A1* | 1/2005 | McCaleb | G06F 8/65 |
| | | | | 717/171 |
| 2005/0166091 | A1* | 7/2005 | Boylan | G06F 9/466 |
| | | | | 714/19 |
| 2009/0006493 | A1* | 1/2009 | Draper | G06F 8/71 |
| 2013/0103990 | A1* | 4/2013 | Hopper | G06F 11/0793 |
| | | | | 714/49 |
| 2014/0006870 | A1* | 1/2014 | Fryman | G06F 11/079 |
| | | | | 714/37 |

FOREIGN PATENT DOCUMENTS

| | | |
|---|---|---|
| JP | 2012-213144 | 11/2012 |
| JP | 5112085 | 1/2013 |

\* cited by examiner

FIG.5A

| COMMON I/F | DESCRIPTION |
|---|---|
| /externalservicename/process/create_folder | Create new folder in designated storage service |
| /externalservicename/process/delete_folder | Delete folder from designated storage service |
| /externalservicename/process/move_folder | Move folder of designated storage service |
| /externalservicename/process/file | Acquire file from designated storage service |
| /externalservicename/process/folder | Store file in designated storage service |
| ... | ... |

FIG.5B

| SPECIFIC I/F | DESCRIPTION |
|---|---|
| /externalservicename/process/extension/attach | Attach file to document stored in designated storage service |
| ... | ... |

FIG.5C

| COMMON I/F | DESCRIPTION |
|---|---|
| /externalservicename/data/files | Acquire file list from designated storage service |
| /externalservicename/data/folders | Acquire folder list from designated storage service |
| ... | ... |

FIG.5D

| SPECIFIC I/F | DESCRIPTION |
|---|---|
| /externalservicename/data/extension/images | Acquire image file list from designated storage service |
| ... | ... |

FIG.6

```
{
    "flowId":"flow1",
    "flowDetails":[
        {
            "operation": "createFolder",
            "parameters":{
                "path":"/folder2"
            }
        },
        {
            "operation":"moveFolder",
            "parameters":{
                "to":"/folder2/folder1",
                "from":"/folder1"
            }
        },
        {
            "operation":"uploadFile",
            "parameters":{
                "path":"/folder2/folder1"
            }
        }
    ]
}
```

| JOB ID | APP ID | FLOW ID | OPERATION | EXECUTION STATUS |
|---|---|---|---|---|
| Job001 | app001 | flow1 | create Folder | DONE |
| | | | move Folder | DONE |
| | | | uplaod File | NOT DONE |
| Job002 | ... | ... | ... | ... |
| ... | | | | |

| OPERATION | RESTORATION OPERATION |
|---|---|
| create Folder | delete Folder |
| move Folder | move Folder |
| upload File | upload File |
| ... | ... |

FIG.13

```
{
    "isSubFlow":true,
    "flowDetails":[
        {
            "operation":"moveFolder",
            "defaultParameters":[
                "to":"/folder1",
                "from":"/folder2/folder1"
            }
        },
        {
            "operation":"deleteFolder",
            "defaultParameters":[
                "path":"/folder2"
            }
        }
    ]
}
```

- 2000
- 2100 (moveFolder block)
- 2200 (deleteFolder block)

| RESTORATION OPERATION | SKIP ERROR INFORMATION |
|---|---|
| delete Folder | folder_not_exist |
| delete File | file_not_exist |
| ... | ... |

FIG.22

```
{
    "isSubFlow":true,
    "flowDetails":[
        {
            "operation":"moveFolder",
            "defaultParameters":{
                "to":"/folder1",
                "from":"/folder2/folder1"
            },
            "doRollback":true
        },
        {
            "operation":"deleteFolder",
            "defaultParameters":{
                "path":"/folder2"
                "doRollback":false
            }
        }
    ]
}
```

FIG.27

```
{
    "flowId":"flow2",
    "flowDetails":[
        {
            "operation": "ocr",
            "parameters":{
                "language":"English",
                "outputType":"pdf"
            }
        },
        {
            "operation":"uploadFile",
            "parameters":{
                "folderId":""
            }
        }
    ]
}
```

| JOB ID | APP ID | FLOW ID | OPERATION | EXECUTION STATUS |
|---|---|---|---|---|
| Job101 | app001 | flow2 | ocr | DONE |
| | | | uploadFile | NOT DONE |
| Job102 | ... | ... | ... | ... |
| ... | | | | |

```
{
    "isSubFlow":true,
    "flowDetails":[
        {
            "operation":"getData",
            "defaultParameters":{          ⎫
                "jobId":"Job101"           ⎬ 4100
            }                              ⎭
        },
        {
            "operation":"uploadFile",      ⎫
            "defaultParameters":{          ⎬ 4200
            }                              ⎭
        }
    ]
}
```

FIG.34

APP ID : app002

APP ID : app001                                                        5000

| FLOW ID | OPERATION | COMPONENT | ERROR INFORMATION | ERROR COUNT |
|---|---|---|---|---|
| flow2 | ocr | OCR COMPONENT | invalid_language | 20 |
| flow2 | uploadFile | DELIVERY COMPONENT | invalid_folder_id | 50 |
| flow2 | uploadFile | DELIVERY COMPONENT | file_size_too_big | 10 |
| flow2 | ... | ... | ... | ... |

FIG.36

| ERROR INFORMATION | OPERATION | COMPONENT | DESCRIPTION |
|---|---|---|---|
| network_error | uploadFile | DELIVERY COMPONENT | Error has occurred in network connection/ communication with external service |
| network_timeout | uploadFile | DELIVERY COMPONENT | Timeout has occurred in network connection/ communication with external service |
| service_unavailable | uploadFile | DELIVERY COMPONENT | External service is temporarily unavailable |
| ... | | | |

6000

INFORMATION PROCESSING SYSTEM, INFORMATION PROCESSING APPARATUS, AND INFORMATION PROCESSING METHOD FOR IMPLEMENTING A SYSTEM ROLLBACK PROCESS

BACKGROUND OF THE INVENTION

1. Field of the Invention

The present invention relates to an information processing system, an information processing apparatus, and an information processing method.

2. Description of the Related Art

Recently, a variety of external services are becoming available through cloud computing and the like, and there are known techniques for enabling a device to perform a process in cooperation with such external services. For example, a technique is known for storing scanned image data obtained by an image forming apparatus in an external storage service.

Also, a technique is known for generating an administrative flow for controlling components that execute various processes based on a predefined administrative flow model (see e.g., Japanese Patent No. 5112085). According to such a technique, components are combined based on the generated administrative flow and a series of processes constituting the administrative flow is executed.

However, according to the above-described technique, when the series of processes ends in failure due to an error that occurs during execution of the series of processes, one or more processes that have been executed before the occurrence of the error may not be undone. That is, the results of the executed processes may remain as is.

For example, a series of processes that includes creating a new folder in an external service and storing image data acquired by scanning a document in the newly created folder may be contemplated. In this case, when an error occurs in the process of storing the image data of the scanned document in the newly created folder such that the series of processes ends in failure, the newly created folder may remain in the external service. Thus, when such a series of processes ends in failure, the folder configuration in the external service is preferably restored to its original state before the execution of the series of processes.

SUMMARY OF THE INVENTION

An aspect of the present invention is directed to restoring a system back to its original state before execution of a series of processes.

According to one embodiment of the present invention, an information processing system is provided that includes at least one information processing apparatus. The information processing system includes a first storage unit configured to store, with respect to each application for executing a first process corresponding to a series of processes using electronic data, application identification information for identifying the application and information relating to the first process in association with each other; a receiving unit configured to receive from a device connected to the information processing system, a request including the application identification information and information relating to electronic data designated at the device; a process execution unit configured to execute the first process based on the information relating to the first process stored in the first storage unit in association with the application identification information that is included in the request received by the receiving unit, the process execution unit executing the first process with respect to electronic data based on the information relating to the electronic data that is included in the request; and a process generation unit configured to generate information relating to a second process when an error has occurred during execution of the first process executed by the process execution unit, the second process corresponding to a series of rollback processes for rolling back a processing result of the first process that has been executed by the process execution unit until the error has occurred. The process execution unit executes the second process based on the information relating to the second process generated by the process generation unit when the error has occurred during the execution of the first process.

BRIEF DESCRIPTION OF THE DRAWINGS

FIGS. 5A-5D are tables listing examples of common interfaces and specific interfaces;

FIG. 6 illustrates an example of process content;

FIG. 11 illustrates an example of a flow progress information table;

FIG. 12 illustrates an example of a restoration information table;

FIG. 13 illustrates an example of restoration process content;

FIG. 19 illustrates an example of a skip error information table;

FIG. 22 illustrates another example of restoration process content;

FIG. 27 illustrates another example of process content;

FIG. 28 illustrates another example of the flow progress information table;

FIG. 29 illustrates an example of resume process content;

FIG. 34 illustrates an example of an error information management table;

FIG. 36 illustrates an example of an auto recoverable error information table;

DESCRIPTION OF THE PREFERRED EMBODIMENTS

In the following, embodiments of the present invention are described with reference to the accompanying drawings.

First Embodiment

<System Configuration>

Figure 1:
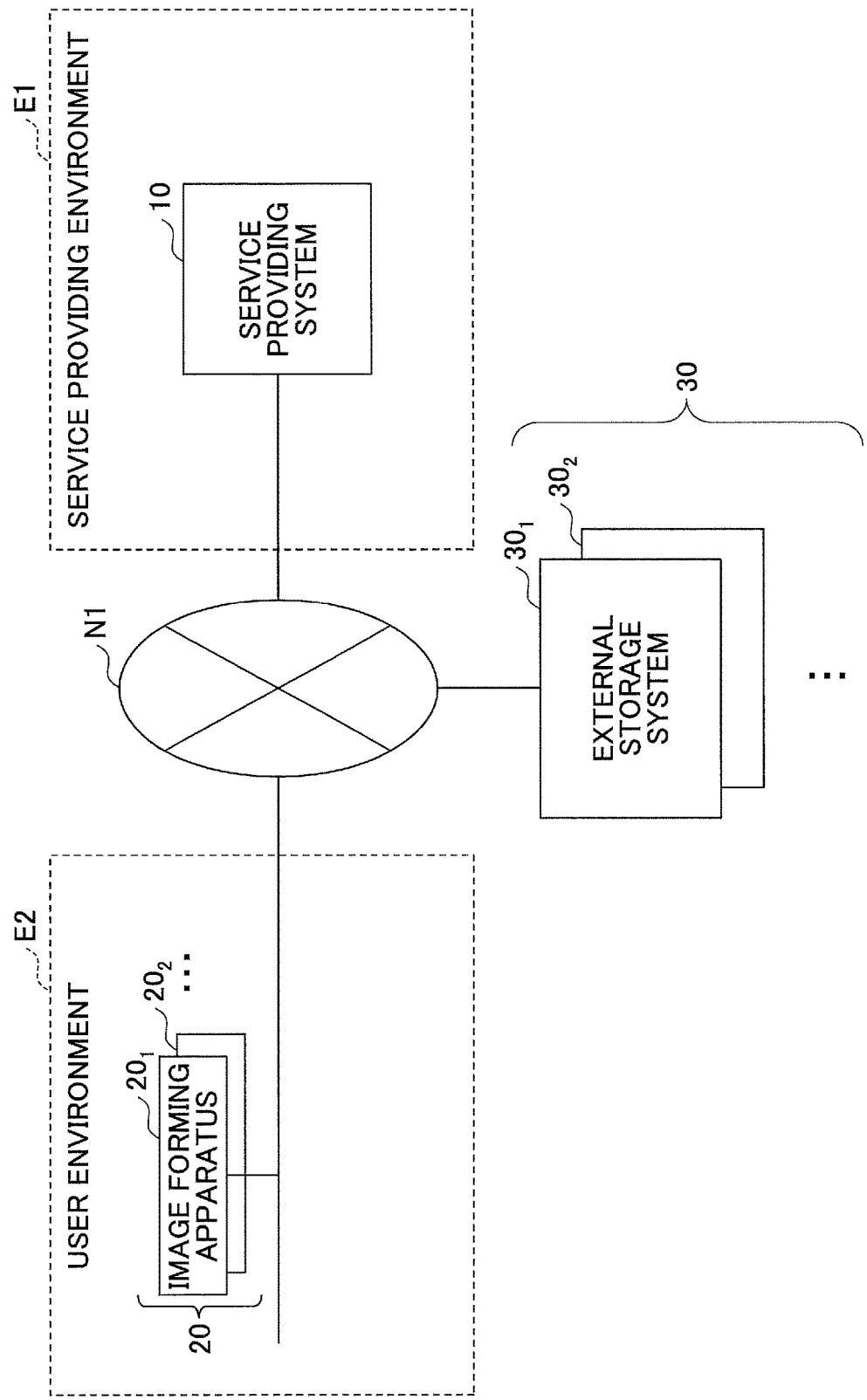
FIG. 1 illustrates an exemplary configuration of an information processing system according to a first embodiment of the present invention.

First, the system configuration of an information processing system 1 according a first embodiment of the present invention will be described with reference to FIG. 1. FIG. 1 illustrates an exemplary configuration of the information processing system 1 according to the first embodiment. In FIG. 1, the information processing system 1 includes a service providing environment E1, a user environment E2, and an external storage system 30 that are communicatively connected via a wide area network N1 such as the Internet.

The service providing environment E1 is a system environment that provides an external service such as a cloud service via a network. In the following descriptions of the present embodiment, a cloud service is illustrated as a specific example of an external service that is provided by the service providing environment E1. However, the present embodiment may also be applied with respect to other services provided via a network such as a service provided by an ASP (Application Service Provider), or a web service, for example.

The service providing environment E1 includes a service providing system 10 that is implemented by at least one information processing apparatus. The service providing system 10 provides a predetermined service in cooperation with an external service. For example, the service providing system 10 may provide a service of storing an electronic file of a scanned document generated by an image forming apparatus 20 of the user environment E2 in the external storage system 30 (scan delivery service). In the following description of the present embodiment, the scan delivery service is described as a specific example of a service provided by the service providing system 10.

Note, however, that the service provided by the service providing system 10 is not limited to the scan delivery service. For example, the service providing system 10 may provide a service of printing an electronic file stored in the external storage system 30 at the image forming apparatus 20 of the user environment E2 (cloud print service). Also, the service providing system 10 may provide a service of performing an Optical Character Recognition (OCR) process on an electronic file of a scanned document generated by the image forming apparatus 20 of the user environment E2, translating the electronic file into a predetermined language, and storing the resulting electronic file in the external storage system 30, for example. Further, the service providing system 10 may provide a service of projecting an electronic file stored in the external storage system 30 at a projector (not shown) provided within the user environment E2, for example.

Note that in some embodiments, all or a part of the service providing system 10 may be included in the user environment E2. In other words, all or a part of the functions of the information processing apparatus constituting the service providing system 10 may be included in the user environment E2.

The user environment E2 may be a system environment of a user such as a corporation that uses the image forming apparatus 20, for example. The user environment E2 may include one or more image forming apparatuses 20 that are interconnected via a network such as a LAN (Local Area Network).

The image forming apparatus 20 according to the present embodiment includes a scan function. Note that the image forming apparatus 20 may be a multifunction peripheral including other functions such as a print function, a copy function, a facsimile (FAX) function, and the like in addition to a scan function, for example.

The external storage system 30 is a computer system that provides a cloud service that is referred to as storage service (or online storage) via a network. A storage service is a service that rents out storage space of the external storage system 30. In the scan delivery service according to the present embodiment, an electronic file is stored (uploaded) in the storage space provided by the external storage system 30.

Note that in the following descriptions, when distinctions are to be made between a plurality of external storage systems 30, a numerical subscript may be used to identify each of the external storage systems 30 such as "external storage system $30_1$" and "external storage system $30_2$". Also, in the following descriptions, it is assumed that "Storage Service A" represents the name of a service provided by the external storage system $30_1$, and "Storage Service B" represents the name of a service provided by the storage system $30_2$.

Also, the external storage system 30 may be a system implemented by a plurality of information processing apparatuses. Further, note that the configuration of the information processing system 1 illustrated in FIG. 1 is merely one example, and the information processing system 1 may have other various system configurations. For example, the user environment E2 may include other various devices such as a projector, an electronic blackboard, a mobile phone, and/or a smartphone in addition to or instead of the image forming apparatus 20.

<Hardware Configuration>

In the following, hardware configurations of the service providing system 10 and the image forming apparatus 20 according to the present embodiment will be described with reference to FIGS. 2 and 3.

<<Service Providing System>>

Figure 2:
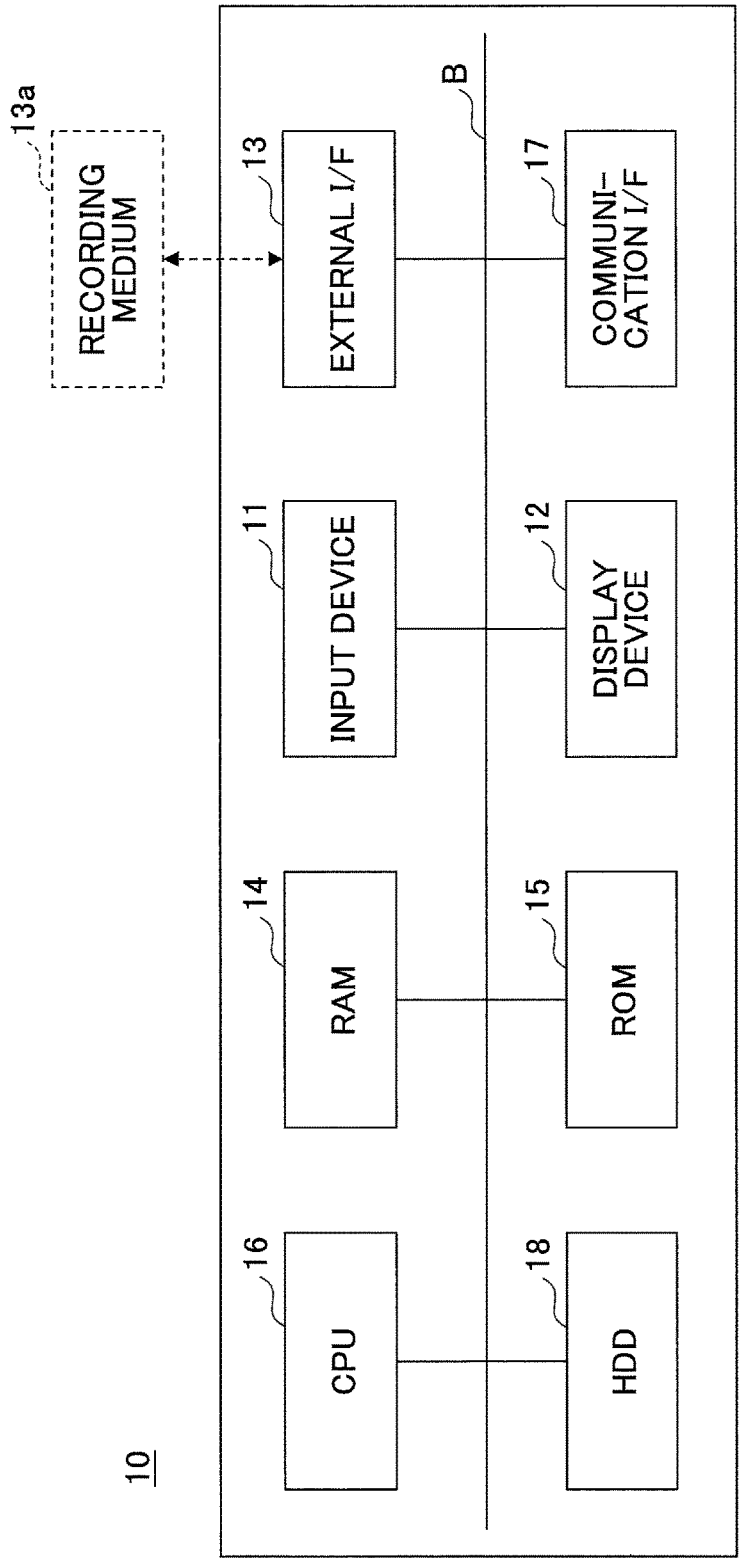
FIG. 2 illustrates an exemplary hardware configuration of a service providing system according to the first embodiment.

The service providing system 10 illustrated in FIG. 1 may have a hardware configuration as illustrated in FIG. 2, for example. FIG. 2 illustrates an exemplary hardware configuration of the service providing system 10 according to the first embodiment. In FIG. 2, the service providing system 10 includes an input device 11, a display device 12, an external I/F (interface) 13, and a RAM (Random Access Memory) 14. Further, the service providing system 10 includes a ROM (Read Only Memory) 15, a CPU (Central Processing Unit) 16, a communication I/F 17, and a HDD (Hard Disk Drive) 18. These hardware elements are interconnected by a bus B.

The input device 11 may include a keyboard, a mouse, and/or a touch panel, for example. The input device 11 is used by the user to input an operation signal. The display device 12 may include a display, for example, and is configured to display a process result of the service providing system 10. Note that in some embodiments, the input device 11 and the display device 12 may be external units that are connected to the service providing system 10 as necessary upon being used, for example.

The communication I/F 17 is an interface for connecting the service providing system 10 to the network N1. In this way, the service providing system 10 may perform data communication via the communication I/F 17.

The HDD 18 is an example of a nonvolatile storage device that stores programs and data. The programs and data stored in the HDD 18 may include an OS (Operating System) corresponding to basic software for performing overall control of the service providing system 10 and application software for providing various functions on the OS, for example. Note that the service providing system 10 may alternatively include a drive device that uses a flash memory as a storage medium (e.g., SSD: Solid State Drive) instead of the HDD 18, for example. Also, the HDD 18 may manage the programs and data stored therein using a predetermined file system and/or a database (DB).

The external I/F 13 is an interface with an external device. The external device may be a recording medium 13a, for example. The service providing system 10 may perform read/write operations on the recording medium 13a via the external I/F 13. The recording medium 13a may be a flexible disk, a CD, a DVD, a SD memory card, a USB memory, or the like.

The ROM 15 is a nonvolatile semiconductor memory (storage device) that is capable of retaining programs and data even when the power is turned off. The ROM 15 may store programs and data such as BIOS (Basic Input/Output System) that is executed upon starting the service providing system 10, OS settings, network settings, and the like. The RAM 14 is a volatile semiconductor memory (storage device) for temporarily storing programs and data.

The CPU 16 is a processor that implements overall control and functions of the service providing system 10 by loading programs and data stored in a storage device such as the ROM 15 or the HDD 18 into the RAM 14, and executing processes based thereon, for example.

The service providing system 10 according to the present embodiment may implement various processes as described below using the hardware configuration as described above.

<<Image Forming Apparatus>>

Figure 3:
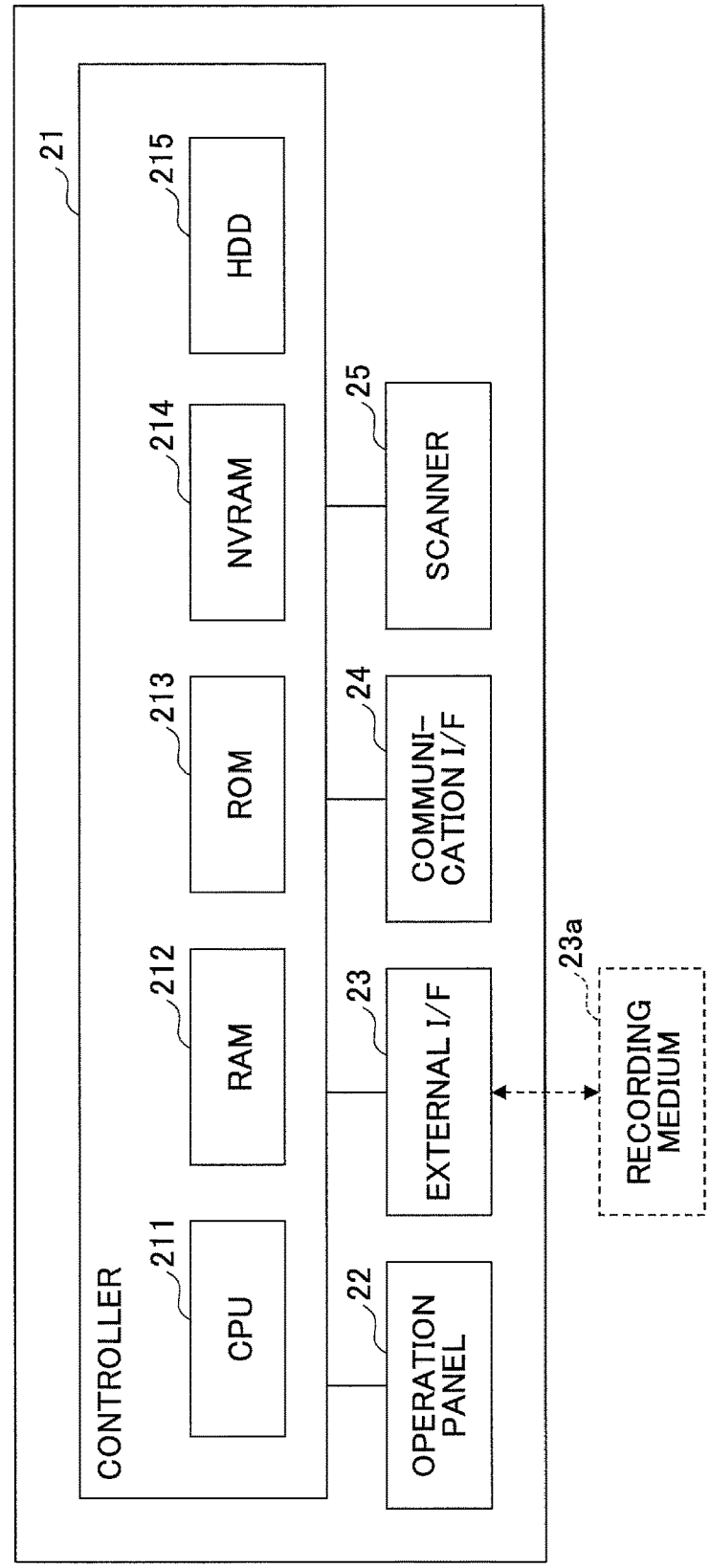
FIG. 3 illustrates an exemplary hardware configuration of an image forming apparatus according to the first embodiment.

The image forming apparatus 20 illustrated in FIG. 1 may have a hardware configuration as illustrated in FIG. 3, for example. FIG. 3 illustrates an exemplary hardware configuration of the image forming apparatus 20 according to the first embodiment. In FIG. 3, the image forming apparatus 20 includes a controller 21, an operation panel 22, an external I/F 23, a communication I/F 24, and a scanner 25. The controller 21 includes a CPU 211, a RAM 212, a ROM 213, a NVRAM 214, and an HDD 215. The ROM 213 stores various programs and data. The RAM 212 temporarily stores programs and data. The NVRAM 214 may store setting information and the like, for example. The HDD 215 also stores various programs and data.

The CPU 211 implements overall control and functions of the image forming apparatus 20 by loading programs, data, and setting information from the ROM 213, the NVRAM 214, the HDD 215 or the like into the RAM 212, and executing processes based thereon, for example.

The operation panel 22 includes an input unit for accepting an input from a user, and a display unit. The external I/F 23 is an interface with an external device. The external device may be a recording medium 23a, for example. The image forming apparatus 20 may perform read/write operations on the recording medium 23a via the external I/F 23. The recording medium 23a may be an IC card, a flexible disk, a CD, a DVD, an SD memory card, a USB memory, or the like.

The communication I/F 24 is an interface for connecting the image forming apparatus 20 to the network N1. In this way, the image forming apparatus 20 may perform data communication via the communication I/F 24. The scanner 25 is a scanning device for scanning a document and generating an image file (electronic file) of the scanned document.

The image forming apparatus 20 according to the present embodiment may implement various processes as described below using the hardware configuration as described above, for example.

<Software Configuration>

Figure 4:
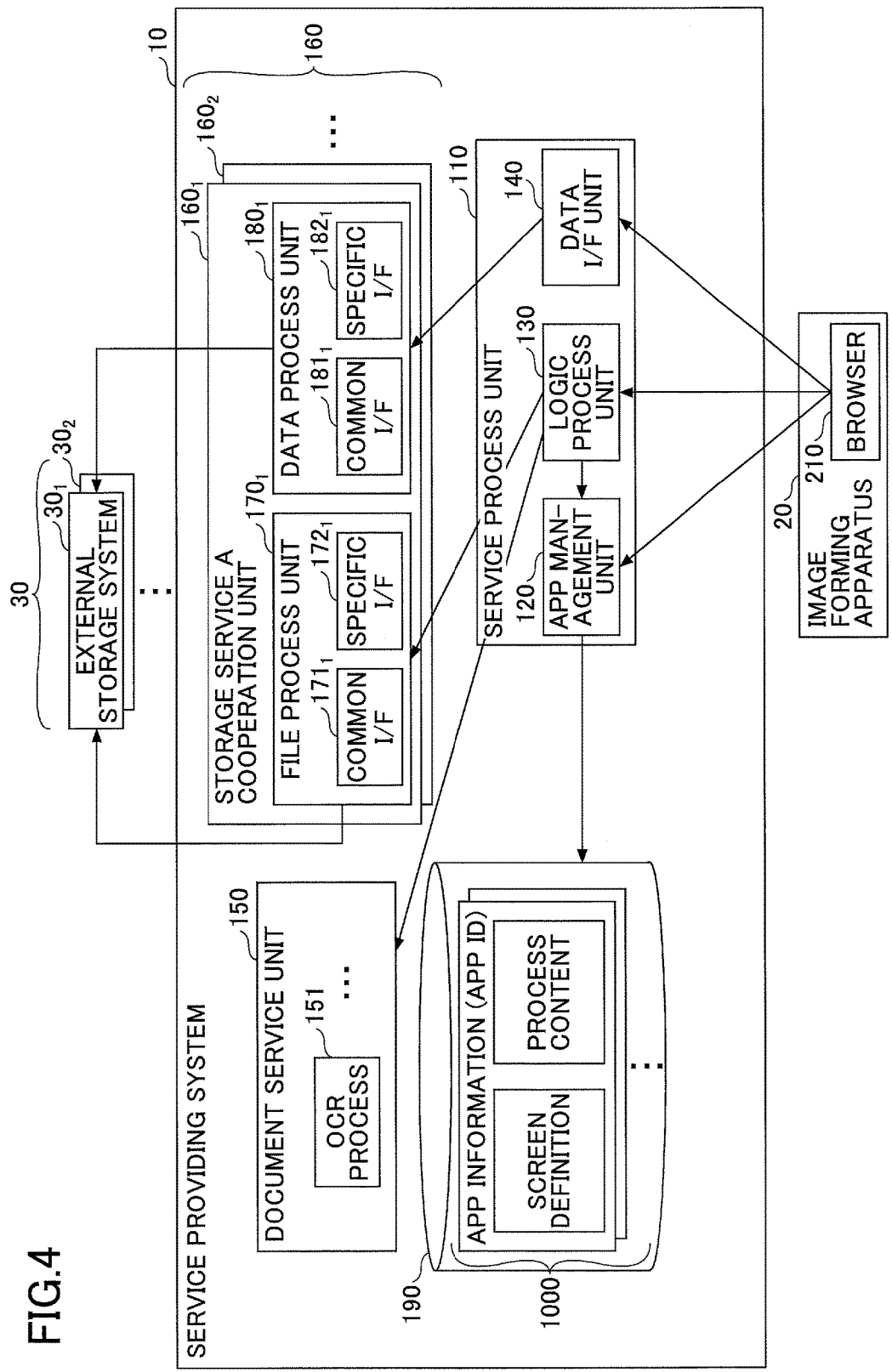
FIG. 4 is a block diagram illustrating an exemplary functional configuration of the information processing system according to the first embodiment.

In the following, a functional configuration of the information processing system 1 according to the present embodiment will be described with reference to FIG. 4. FIG. 4 is a process block diagram illustrating an exemplary functional configuration of the information processing system 1 according to the first embodiment.

In FIG. 4, the image forming apparatus 20 includes a browser 210 that may be implemented by the CPU 211, for example. A user of the image forming apparatus 20 may be able to use a service provided by the service providing system 10 via the browser 210. Thus, in the image forming apparatus 20 according to the present embodiment, for example, a dedicated application for using a service does not have to be developed as long as the browser 210 is installed in the image forming apparatus 20.

The service providing system 10 includes a service process unit 110, a document service unit 150, and a storage service cooperation unit 160. These functional components may be implemented by the CPU 16 executing one or more programs that are installed or downloaded in the service providing system 10, for example.

The service providing system 10 also includes an app (application) information storage unit 190. The app information storage unit 190 may be implemented by the HDD 18, for example. Alternatively, the app information storage unit 190 may be implemented by a storage device or the like that is connected to the service providing system 10 via a network, for example.

The service process unit 110 includes an app management unit 120, a logic process unit 130, and a data I/F unit 140.

The app management unit 120 manages app information 1000 that is stored in the app information storage unit 190. Upon receiving a request from the browser 210, the app management unit 120 returns an app screen based on a screen definition included in the app information 1000 to the browser 210. In this way, an app screen for using a service provided by the service providing system 10 may be displayed by the browser 210 of the image forming apparatus 20. Note that in the present embodiment, the app information 1000 corresponds to information describing a screen definition for displaying the app screen as described above at the image forming apparatus 20 and process content of a service to be implemented by the app information 1000.

Also, upon receiving a request from the logic process unit 130, the app management unit 120 returns the process content included in the app information 1000 to the logic process unit 130. As described in detail below, a series of processes for implementing a service provided by the service providing system 10 such as the scan delivery service is described in the process content of the app information 1000. Note that in the following descriptions, a series of processes for implementing a service provided by the service providing system 10 may also be referred to as "process flow" or "flow".

The logic process unit 130 acquires the process content from the app management unit 120 in response to a request from the browser 210. Then, based on the acquired process content, the logic process unit 130 sends process execution requests to relevant units such as the document service unit 150 and/or a file process unit 170 of the storage service cooperation unit 160, for example. In this way, various services by the service providing system 10 may be provided to the image forming apparatus 20. Note that a functional configuration of the logic process unit 130 is described in detail below.

The data I/F unit 140 sends a predetermined request (e.g., folder list acquisition request) to a data process unit 180 of the storage service cooperation unit 160 in response to a request from the browser 210.

The document service unit 150 corresponds to a group of programs (modules) for implementing the services provided by the service providing system 10. For example, the document service unit 150 may include an OCR process 151 for executing an OCR process on an electronic file. Also, the document service unit 150 may include a program for enabling the image forming apparatus 20 to convert an electronic file into data in a printable data format (print data), a program for compressing or decompressing an electronic file, a program for performing a language translation process, and other programs for executing various processes, for example.

The storage service cooperation unit 160 sends various process execution requests to the external storage system 30 in response to requests from the logic process unit 130 and the data I/F unit 140. Note that in the present embodiment, the service providing system 10 includes a storage service cooperation unit 160 for each external storage system 30. That is, the service providing system 10 includes a storage service A cooperation unit $160_1$ for sending a process request to the external storage system $30_1$, a storage service B cooperation unit $160_2$ for sending a process request to the external storage system $30_2$, and so forth. In this way, the service providing System 10 includes a storage service cooperation unit 160 corresponding to each external storage system 30 with which the service providing system 10 cooperates to execute various processes. Note that in the following descriptions, when distinctions are to be made between the plurality of storage service cooperation units 160, a numerical subscript may be used to identify each of the storage service cooperation units 160 such as "storage service A cooperation unit $160_1$," and "storage service B cooperation unit $160_2$".

Also, as described above, the storage service cooperation unit 160 includes the file process unit 170 for accepting a request from the logic process unit 130, and the data process unit 180 for accepting a request from the data I/F unit 140.

The file process unit 170 includes a common I/F 171 and a specific I/F 172 that define APIs (Application Programming Interface) for performing operations (e.g., file storage, folder creation) with respect to the external storage system 30. The common I/F 171 corresponds to an API that can be used among the plurality of external storage systems 30. For example, the common I/F 171 of the file process unit 170 may include APIs as illustrated in FIG. 5A. In other words, the common I/F 171 of the file process unit 170 corresponds to a group of APIs for implementing functions related to file operations (e.g., file acquisition, file storage) that can be used by all of the external storage systems 30. On the other hand, the specific I/F 172 corresponds to an API that can be implemented in a specific external storage system 30. The specific I/F 172 may include an API as illustrated in FIG. 5B, for example. In other words, the specific I/F 172 of the file process unit 170 corresponds to a group of APIs for implementing a function related to a file operation (e.g., file editing) that can be used by a specific external storage system 30. Thus, the common I/F 171 is identically defined in all of the storage service cooperation units 160, whereas the specific I/F 172 is defined in the storage service cooperation unit 160 for the specific external storage system 30 in which the API defined by the specific I/F 172 can be implemented.

The data process unit 180 includes a common I/F 181 and a specific I/F 182 that define APIs for performing operations such as acquiring bibliographic information or some other metadata (e.g., file list, folder list) relating to an electronic file stored in the external storage system 30. The common I/F 181 of the data process unit 180 corresponds to an API that can be commonly used among the plurality of external storage systems 30. For example, the common I/F 181 may include APIs as illustrated in FIG. 5C. In other words, the common I/F 181 of the data process unit 180 corresponds to a group of APIs for implementing functions such as metadata acquisition that can be used by all of the external storage systems 30. On the other hand, the specific I/F 182 corresponds to an API that can be implemented in a specific external storage system 30. For example, the specific I/F 182 may include an API as illustrated in FIG. 5D. In other words, the specific I/F 182 of the data process unit 180 corresponds to a group of APIs for implementing a function such as metadata acquisition (e.g., acquisition of an image file list) that can be used by a specific external storage system 30. Thus, the common I/F 181 is identically defined in all of the storage service cooperating units 160, whereas the specific I/F 182 is defined in the storage service cooperation unit 160 for the specific external storage system 30 in which the API defined by the specific I/F 182 can be implemented. Note that an additional storage service cooperation unit 160 may be added using a SDK (Software Development Kit), for example.

Note that the APIs defined in the common I/Fs 171, 181, and the specific I/Fs 172, 182 illustrated in FIGS. 5A-5D may be used by designating the name of a desired storage service (storage service name) in the "externalservicename". That is, the "externalservicename" is defined as a variable part of the APIs.

The app information storage unit 190 stores the app information 1000. The app information 1000 is information describing a screen definition for displaying an app screen at the image forming apparatus 20 and process content indicating a series of processes for implementing a service provided by the service providing system 10. The app information storage unit 190 stores the app information 1000 with respect to each app ID that uniquely identifies the app information 1000. In the present embodiment, it is assumed that "app information $1000_1$," corresponds to the app information for implementing a scan delivery service in cooperation with the storage service A, and "app001" corresponds to the app ID of the app information $1000_1$.

FIG. 6 illustrates an example of process content included in the app information $1000_1$. That is, FIG. 6 illustrates process content 1100 describing a series of processes that includes creating a new folder "folder2" in the storage service A, moving "folder1" directly below "folder2", and delivering an electronic file to "folder1". Note that a flow ID "flow1" uniquely identifying the process content 1100 within the app information $1000_1$ is defined as the flow identifier "flowId" of the process content 1100. Also, operations 1101 through 1103 are defined as "flowDetails" of the process content 1100 illustrated in FIG. 6.

Note that in the present descriptions, "operation" refers to information relating to each process included in a series of processes for implementing a service provided by the service providing system 10. Thus, one or more operations are defined in the process content for implementing a service provided by the service providing system 10.

The process content 1100 includes operation 1101 for creating a new folder in the storage service A, operation 1102 for moving a folder in the storage service A, and operation 1103 for delivering an electronic file to the storage service A. In the following, each of the operations 1101-1103 will be described in greater detail. Operation 1101 defines a process of creating a new folder with the folder name "folder2" (folder path "/folder2") directly under the folder path "/" of the storage service A. Further, operation 1102 defines a process of moving a folder "folder1" that is already located directly under the folder path "/" of the storage service A (folder path "/folder1") to a location directly under "folder2". Further, operation 1103 defines a process of delivering (uploading) an electronic file into the folder "folder1" of the storage service A (folder path "/folder2/folder1").

Note that the process content 1100 illustrated in FIG. 6 is merely one example of process content for implementing a scan delivery service. In some examples, the scan delivery service may be implemented by a series of processes including one or more processes implemented by a program included in the document service unit 15. For example, the scan delivery service may be implemented by a series of processes that includes performing an OCR process on a scanned electronic file and delivering the processed electronic file to a specific folder of the storage service A.

Also, note that the app information $1000_1$ may include a plurality of process contents. That is, one set of the app information 1000 may include different process contents with different flow IDs.

Figure 7:
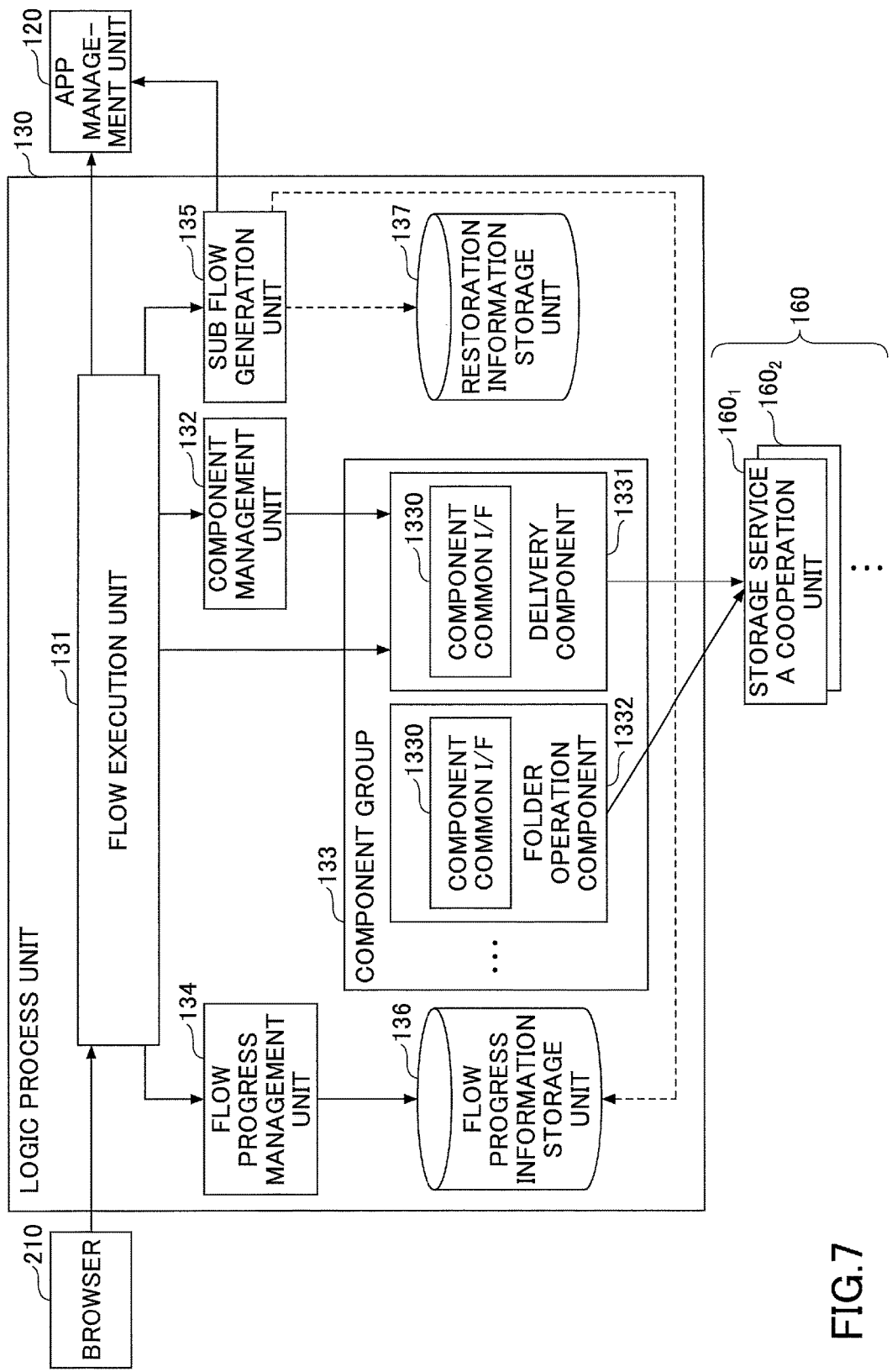
FIG. 7 is a block diagram illustrating an exemplary functional configuration of a logic process unit according to the first embodiment.

In the following, a functional configuration of the logic process unit 130 according to the present embodiment is described with reference to FIG. 7. FIG. 7 is a process block diagram illustrating an exemplary functional configuration of the logic process unit 130 according to the first embodiment. The logic process unit 130 includes a flow execution unit 131, a component management unit 132, a component group 133, a flow progress management unit 134, a sub flow generation unit 135, a flow progress information storage unit 136, and a restoration information storage unit 137.

When the flow execution unit 131 receives a process execution request from the browser 210 requesting for the execution of a process of the scan delivery service, the flow execution unit 131 acquires the corresponding process content from the app information 1000 via the app management unit 120. Then, according to the operations defined in the acquired process content, the flow execution unit 131 issues a process execution request with respect to a relevant component. Note that the component described above corresponds to a module or the like for executing various processes. The component may be defined by classes and/or functions, for example.

Also, when the flow execution unit 131 receives a process result from a component, the flow execution unit 131 requests the flow progress management unit 134 to store and manage flow progress information relating to the relevant flow. Note that flow progress information refers to information relating to an operation that has been executed among the operations defined in the process content of the flow.

The component management block 132 generates a component in response to a request from the flow execution unit 131. Note that generating a component refers to loading a component defined by a class into a memory (e.g., RAM 14), for example.

The component group 133 corresponds to a group of components. The component group 133 includes a delivery component 1331 for delivering an electronic file to the external storage system 30, and a folder operation component 1332 for performing folder operations such as creating a new folder and moving a folder (changing a folder path) of the external storage system 30. Note that the component group 133 may also include an acquisition component for acquiring an electronic file from the external storage system 30 and/or an OCR component for performing an OCR process on an electronic file, for example.

As described above, the component group 133 defines components that execute processes of operations defined in process content. Thus, based on the operations defined in the process content, the flow execution unit 131 may request a relevant component to execute a relevant process and thereby execute a series of processes for implementing a service provided by the service providing system 10.

Further, each of these components includes a component common I/F 1330. The component common I/F 1330 includes a group of APIs that are commonly defined in each component. For example, the component common I/F 1330 may include an API for generating a component and an API for issuing a process execution request with respect to a component. By arranging each component to include the component common I/F 1330, an impact from adding a component may be localized, for example. In this way, the number of steps required for developing an additional component or the like may be reduced, for example.

When the flow progress management unit 134 receives flow progress information from the flow execution unit 131, the flow progress management unit 134 stores the received flow progress information in the flow progress information storage unit 136.

When an error or the like occurs in a process of a component that is executed according to operations defined in process content of a series of processes (when execution of the process content is abnormally terminated due to failure of one of its processes), the sub flow generation unit 135 generates process content for restoring data to a previous state before the execution of the series of processes that has failed. Note that in the following descriptions, the process content generated by the sub flow generation unit 135 is referred to as "restoration process content". The sub flow generation unit 135 stores the generated restoration process content in the app information storage unit 190 via the app management unit 120.

Note that the process of restoring data to a previous state before execution of the series of processes as described above refers to a process of undoing all changes made to various data in the external storage system 30 during the execution of the series of processes and restoring the data to a previous state before execution of the series of processes. Such a process may also be referred to as "rollback".

The flow progress information storage unit 136 stores a flow progress information table 1361. The flow progress information table 1361 manages an execution status of each of the operations defined in process content of a series of processes. In this way, the flow progress management unit 134 may be able to manage information on the execution progress of the operations defined in the process content indicating information on the series of processes. Note that the flow progress information table 1361 is described in detail below.

The restoration information storage unit 137 stores a restoration information table 1371. The restoration information table 1371 manages information for generating a restoration process content based on process content. That is, the restoration information table 1371 manages, with respect to each operation that is defined in process content, an operation (restoration operation) for undoing a process that has been executed according to the operation. Note that the restoration information table 1371 is described in detail below.

As described above, the service providing system 10 according to the present embodiment manages the execution status of operations defined in process content indicating information relating to a series of processes. Further, the service providing system 10 according to the present embodiment manages information on a restoration operation for undoing a process executed according to an operation defined in the process content. In this way, when an error or the like occurs while executing a process of a component according to an operation defined in process content of a series of processes, the service providing system 10 according to the present embodiment may be able to undo one or more processes that have already been executed prior to the error occurrence.

<Process Details>

In the following, processes implemented by the information processing system 1 according to the present embodiment are described in detail.

<<Overall Process of Scan Delivery Service>>

Figure 8:
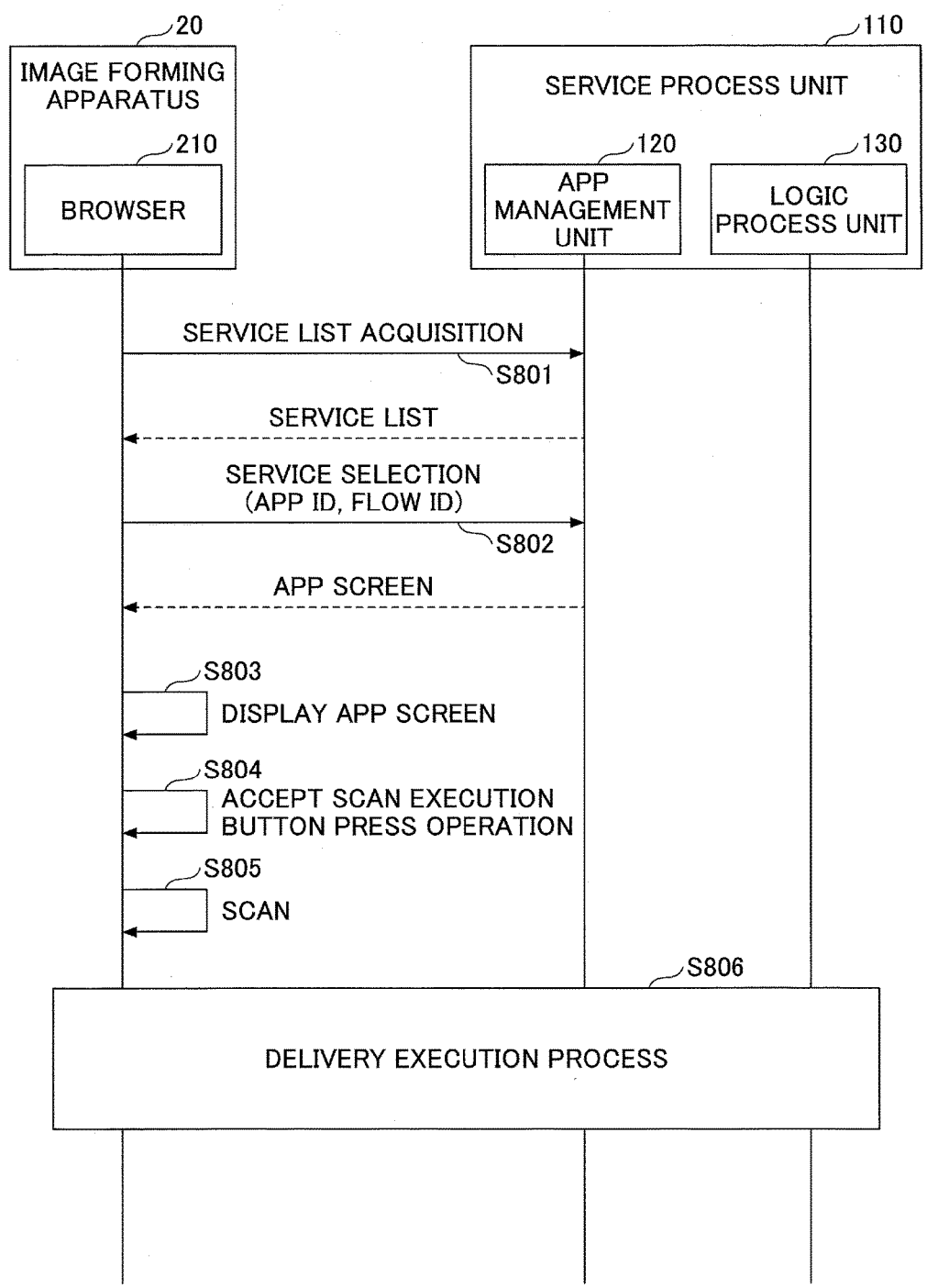
FIG. 8 is a sequence chart illustrating an overall process of a scan delivery service according to the first embodiment.

First, an overall process implemented in a case where a user of the image forming apparatus 20 uses the scan delivery service according to the present embodiment is described. FIG. 8 is a sequence chart illustrating an exemplary overall process of the scan delivery service according to the first embodiment.

The user of the image forming apparatus 20 uses the browser 210 to perform an operation for acquiring a list of services provided by the service providing system 10. In turn, the image forming apparatus 20 transmits a service list acquisition request to the service process unit 110 of the service providing system 10 (step S801). The app management unit 120 of the service process unit 110 receives the service list acquisition request, and transmits a list of services provided by the service providing system 10 to the image forming apparatus 20. In this way, the browser 210 of the image forming apparatus 20 displays the list of services provided by the service providing system 10 at the operation panel 22 of the image forming apparatus 20. Note that the list of services may include the service names of the services provided by the service providing system 10, app IDs of the corresponding app information 1000 for implementing the services, and flow IDs of the process contents included in the corresponding app information 1000.

The user selects a desired service that the user wishes to use from the list of services displayed at the operation panel 22 of the image forming apparatus 20. In turn, the browser 210 sends the app ID of the app information 1000 for implementing the selected service to the app management unit 120 (step S802). In the example described below, it is assumed that "scan delivery service" for scanning and delivering an electronic file to the storage service A has been selected by the user. In this case, the browser 210 transmits the app ID "app001" of the app information 1000$_1$ to the app management unit 120. The app management unit 120 generates an app screen in HTML (HyperText Markup Language) format based on the screen definition that is included in the app information 1000$_1$ corresponding to the app ID "app001" received from the browser 210, and transmits the generated app screen to the browser 210.

Figure 9:
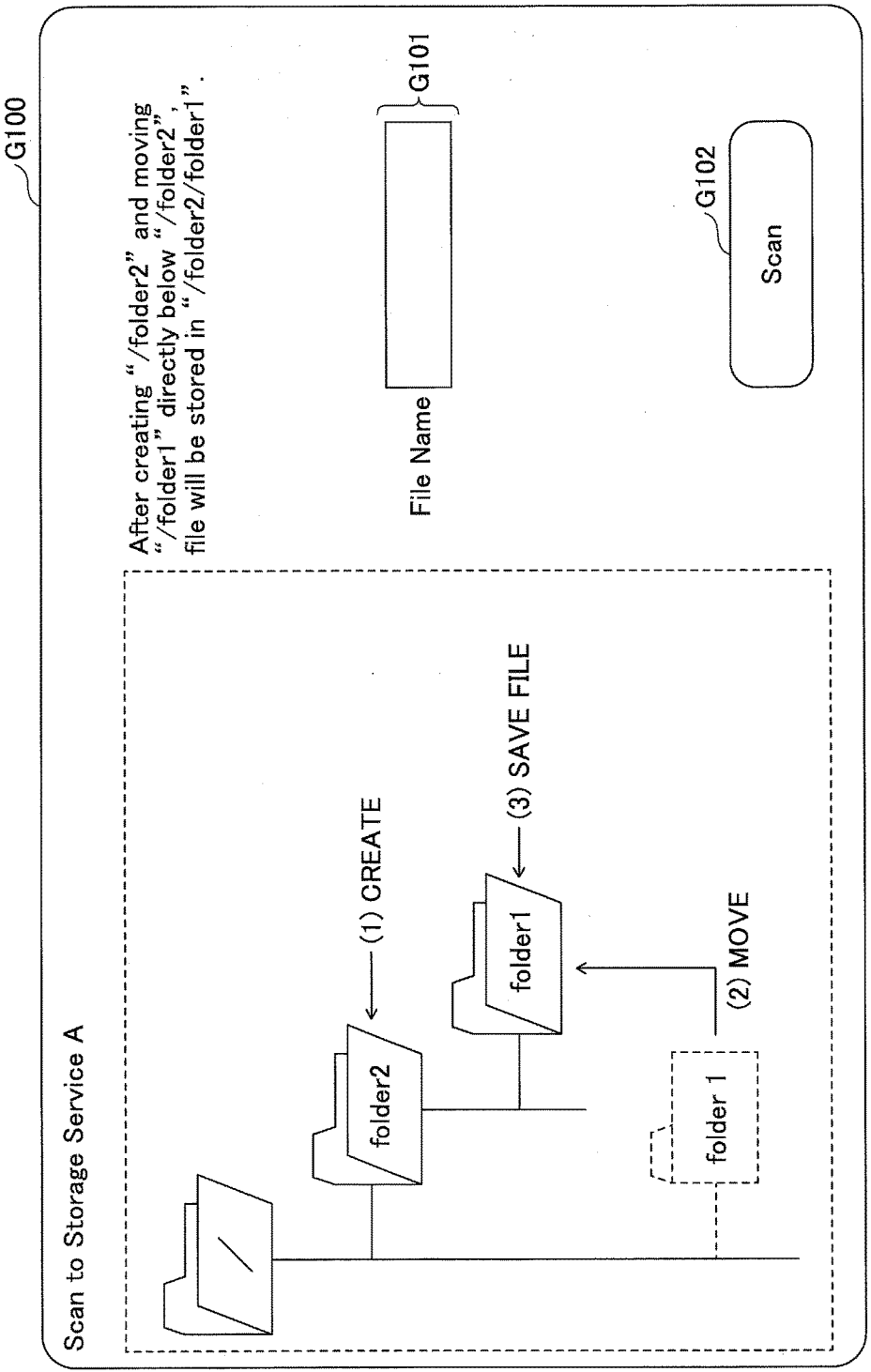
FIG. 9 illustrates an exemplary application screen for using the scan delivery service.

When the browser 210 receives the app screen from the app management unit 120, the browser 210 may display an app screen G100 as illustrated in FIG. 9, for example, at the operation panel 22 (step S803). FIG. 9 illustrates an exemplary app screen G100 for using the scan delivery service for scanning and delivering an electronic file to the storage service A.

Figure 10:
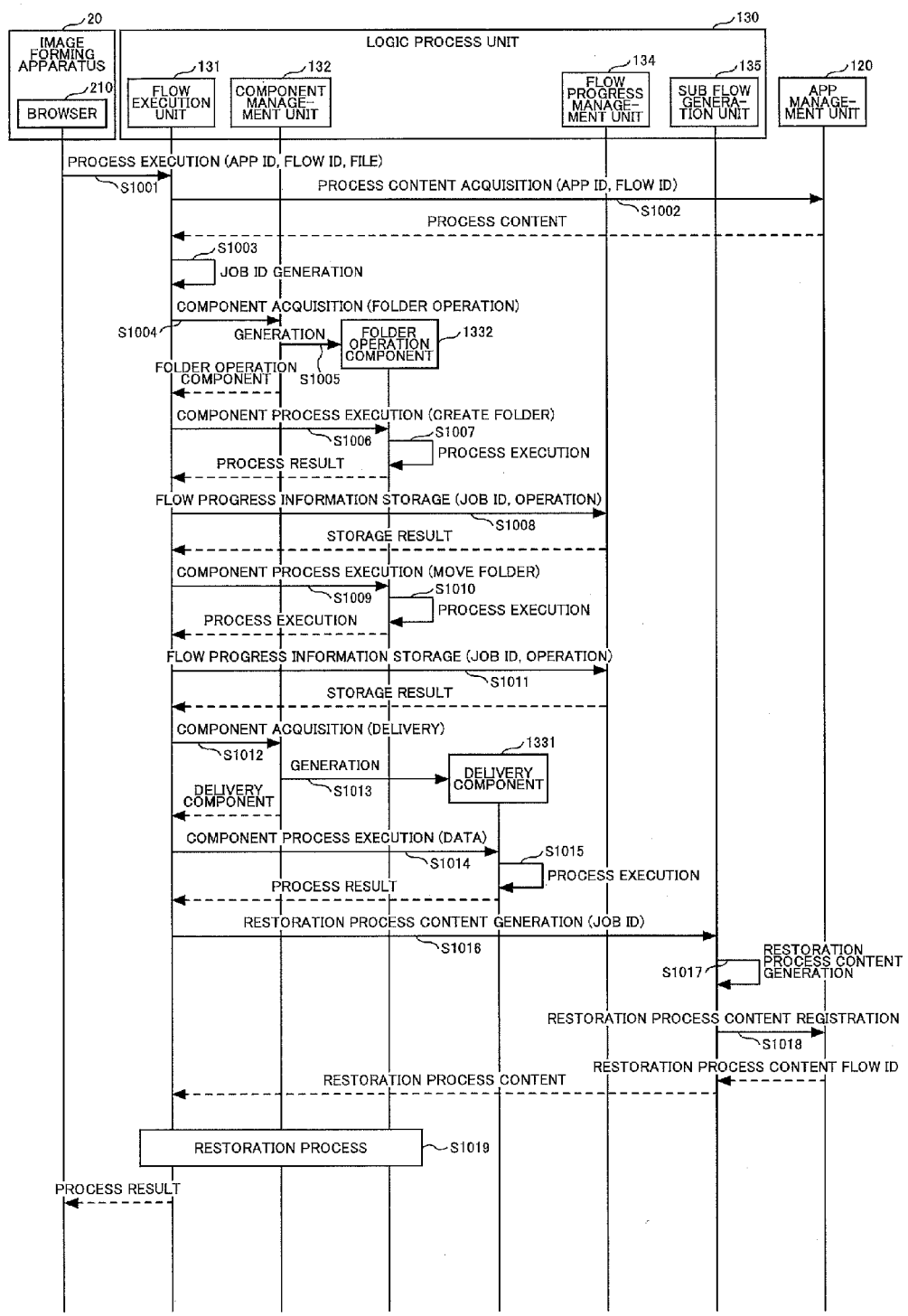
FIG. 10 is a sequence chart illustrating an exemplary delivery execution process according to the first embodiment.

Next, the user enters a desired file name to be assigned to an electronic file to be generated by a scanning operation in a file name input field G101 of the app screen G100 illustrated in FIG. 10. Then, the user sets a document on the scanner 25 of the image forming apparatus 20, and presses a scan execution button G102. In turn, the browser 210 accepts the operation of the user pressing the scan execution button G102 (step S804). In this way, the document is scanned by the scanner 25 of the image forming apparatus 20 and an electronic file with the file name entered by the user is generated (step S805). Note that in the present example, it is assumed that "test" has been entered as the file name in the file name input field G101.

Note that in the app screen G100 illustrated in FIG. 9, the folder "folder1" corresponding to the storage destination of the electronic file is to be moved directly below the folder "folder2" that is to be newly created. However, in other examples, the user may be able to select the folder that is to become the storage destination of the electronic file. For example, the data I/F unit 140 may acquire a list of folders of the storage service A via the data process unit 180, and the user may be able to select a desired folder as the storage destination folder from the acquired folder list. In this case, the folder selected by the user may be moved to a location directly below the folder "folder2" that is to be newly created.

Then, the image forming apparatus 20 performs a delivery execution process for delivering the generated electronic file to the storage service A (step S806). In the following, the delivery execution process will be described in detail with reference to FIG. 10. Note that FIG. 10 describes an exemplary case where the delivery execution process for delivering (uploading) an electronic file in the storage service A ends in failure (error).

<<Delivery Execution Process>>

FIG. 10 is a sequence chart illustrating exemplary process steps of a delivery execution process according to the first embodiment.

First, the browser 210 of the image forming apparatus 20 sends a process execution request for the scan delivery service to the flow execution unit 130 (step S1001). In the present example, the process execution request includes the app ID "app001", the flow ID "flow1" identifying the process content to be executed, the electronic file generated by the scanning operation, and the like. When the flow execution unit 131 receives the process execution request, the flow execution unit 131 acquires the process content with the flow ID "flow1" from the app information 1000$_1$ with the app ID "app001" that is included in the received process execution request via the app management unit 120 (step S1002). For example, the flow execution unit 131 may acquire the process content 1100 as illustrated in FIG. 6.

In turn, the flow execution unit 131 generates a job ID for uniquely identifying a job to be executed based on the process content 1100 acquired in step S1002 (step S1003). In the present example, it is assumed that a job ID "Job001" is generated by the flow execution unit 131.

Next, the flow execution unit 131 sends a component acquisition request to the component management unit 132 according to an operation defined in the acquired process content (step S1004). More specifically, the flow execution unit 131 sends a component acquisition request for acquiring the folder operation component 1332 based on the operation 1100 defined in the process content 1100 illustrated in FIG. 6.

Upon receiving the component acquisition request for acquiring the folder operation component 1332, the component management unit 132 generates the folder operation component 1332 (step S1005). The folder operation component 1332 can be generated using the API for generating a component that is defined in the component common I/F 1330. When the folder operation component 1332 is generated, the component management unit 132 returns the folder operation component 1332 to the flow execution unit 131. For example, the component management unit 132 may return an address of the memory (e.g., RAM 14) where the folder operation component 1332 has been loaded to the flow execution unit 131.

The flow execution unit 131 designates the folder path "/folder2" of the folder to be newly created in a component process execution request and sends the component process execution request to the folder operation component 1332 that has been generated (step S1006).

In turn, the folder operation component 1332 executes the corresponding component process (step S1007). That is, the folder operation component 1332 creates a new folder "folder2" with the folder path "/folder2". Then, the folder operation component 1332 returns a process result of the executed component process to the flow execution unit 131. More specifically, the folder operation component 1332 requests the file process unit 170$_1$ of the storage service A cooperation unit 160$_1$ to create a folder using an API defined as the common I/F 171$_1$. That is, the folder operation component 1332 may use the API "externalservicename/process/createfolder" indicated in FIG. 5A, for example, to designate "service-a/process/create_folder?path=/folder2". In this way, the folder "folder2" with the folder path "/folder2" may be newly created.

Then, the flow execution unit 131 sends a flow progress information storage request for storing flow progress information to the flow progress management unit 134 (step S1008). Note that in the present case, the flow progress information includes the job ID "Job001" generated in step S1003 and the operation name "createFolder" of the operation 1101 corresponding to the process executed by the folder operation component 1332. Then, the flow progress management unit 134 updates the flow progress information table 1361 of the flow progress information storage unit 136 based on the job ID and the operation name included in the flow progress information.

More specifically, based on the job ID "Job001" and the operation name "createFolder" included in the flow progress information, the flow progress management unit 134 updates the flow progress information table 1361 as illustrated in FIG. 11 by altering the execution status of the operation "create Folder" included in the record identified by the job ID "Job001" in the flow progress information table 1361 to "DONE" to indicate that the corresponding operation has been executed. In this way, information indicating that the operation 1101 of the operations defined in the process content 1100 acquired in step S1002 has been executed (i.e., properly processed) may be managed by the flow progress management unit 134.

Note that each record identified by a job ID in the flow progress information table 1361 may be created at the time the job ID is generated in step S1003, and the execution statuses of the operations included in the record may be set to "NOT DONE" at this time, for example. Alternatively, a record associated with a job ID may be created in the flow progress information table 1361 when the flow progress management unit 134 first receives a flow progress information storage request relating the job identified by the job ID, and the execution statuses of the operations included in the record may be set to "NOT DONE" at this time, for example.

Then, based on the operation 1102 defined after the operation 1101 in the process content 1100 illustrated in FIG. 6, the flow execution unit 131 sends a component process execution request for moving a folder to the folder operation component 1332 (step S1009). That is, the flow execution unit 131 designates the folder path "/folder1" corresponding to the original location and the folder path "/folder2/folder1" corresponding to the moving destination in the component process execution request sent to the folder operation component 1332.

In turn, the folder operation component 1331 executes the corresponding process (step S1010). That is, the folder operation component 1332 moves the folder with the folder path "/folder1" to a location directly below the folder with the folder path "/folder2" in the storage service A (i.e., that folder path "/folder1" is changed to "/folder1/folder2". Then, the folder operation component 1332 returns a process result of the executed process to the flow execution unit 131.

More specifically, the folder operation component 1332 requests the file process unit 170₁ of the storage service A cooperation unit 160₁ to move the folder using an API for moving a folder that is defined as the common I/F 171₁. That is, the folder operation component 1332 may use the API "externalservicename/process/move_folder" indicated in FIG. 5A, for example, to designate "service-a/process/move_folder?from=/folder1&to=folder2/folder1". In this way, the folder with the folder path "/folder1" may be moved directly below the folder with the folder path "/folder2" in the storage service A.

Then, the flow execution unit 131 sends a flow progress information storage request for storing flow progress information to the flow progress management unit 134 (step S1011). Note that in the present case, the flow progress information includes the job ID "Job001" generated in step S1003 and the operation name "moveFolder" of the operation 1102 corresponding to the process executed by the folder operation component 1332. Then, the flow progress management unit 134 updates the flow progress information table 1361 of the flow progress information storage unit 136 based on the job ID and the operation name included in the flow progress information.

More specifically, based on the job ID "Job001" and the operation name "moveFolder" included in the flow progress information, the flow progress management unit 134 updates the flow progress information table 1361 as illustrated in FIG. 11 by altering the execution status of the operation "move Folder" included in the record identified by the job ID "Job001" in the flow progress information table 1361 to "DONE" to indicate that the corresponding operation has been executed. In this way, information indicating that the operation 1102 of the operations defined in the process content 1100 acquired in step S1002 has been executed (i.e., properly processed) may be managed by the flow progress management unit 134.

Then, the flow execution unit 131 sends a component acquisition request to the component management unit 132 according to an operation defined in the process content 1100 acquired in step S1002 (step S1012). More specifically, the flow execution unit 131 sends a component acquisition request for acquiring the delivery component 1331 to the component management unit 132 based on the operation 1103 defined after the operation 1102 of the process content 1100 illustrated in FIG. 6.

Upon receiving the component acquisition request for the delivery component 1331, the component management unit 132 generates the delivery component 1331 (step S1013). Note that the delivery component 1331 can be generated using the API for generating a component that is defined in the component common I/F 1330. Then, when the delivery component 1331 is generated, the component management unit 132 returns the delivery component 1331 to the flow execution unit 131. For example, the component management unit 132 may return an address of the memory (e.g., RAM 14) where the delivery component 1331 has been loaded to the flow execution unit 131.

Then, the flow execution unit 131 designates data in a component process execution request and sends the component process execution request to the delivery component 1331 that has been generated (step S1014). Note that the data designated in the above component process execution request corresponds to an electronic file generated by a scanning operation. That is, the flow execution unit 131 simply hands the electronic file received from the browser 210 as "data" (without paying heed to the data type) to the delivery component 1331 and requests the delivery component 1331 to execute a relevant process.

Upon receiving the data from the flow execution unit 131, the delivery component 1331 executes the relevant process (step S1015). Then, the delivery component 1331 returns a process result of the executed process to the flow execution unit 131.

More specifically, the delivery component 1331 requests the file process unit 170₁ of the storage service A cooperation unit 160₁ to execute a data delivery process using an API for storing a file that is defined as the common I/F 171₁. That is, the delivery component 1331 may use the API "externalservicename/process/folder" indicated in FIG. 5A, for example, to designate "service-a/process/folder?path=/folder2/folder1&name=test". In this way, an electronic file with the file name "test" may be delivered to the folder with the folder path "/folder2/folder1" in the storage service A.

As described above, in the present example, it is assumed that an error or the like occurs in the the process of step S1015. That is, it is assumed that the delivery component 1331 has failed to properly deliver (upload) the electronic file to the designated storage destination. Accordingly, in the present case, the delivery component 1331 returns information indicating that an error has occurred (error information) to the flow execution unit 131 as a process result.

Then, upon receiving the error information from the delivery component 1331, the flow execution unit 131 sends a restoration process content generation request to the sub flow generation unit 135 designating the job ID "Job001" generated in step S1003 (step S1016).

The sub flow generation unit 135 refers to the flow progress information table 1361 and the restoration information table 1371 to generate the restoration process content (step S1017). Note that the sub flow generation unit 135 may generate the restoration process content in the following manner.

That is, the sub flow generation unit 135 refers to the record identified by the designated job ID "Job001" in the flow progress information table 1361 and successively acquires operations having execution statuses set to "DONE". In the present example, the restoration operation "deleteFolder" corresponding to the operation "create Folder" and "move Folder" are successively acquired in the recited order.

Then, the sub flow generation unit 135 refers to the restoration information table 1371 as illustrated in FIG. 12, for example, to acquire corresponding restoration operations in the reverse order from the order in which the above operations were acquired. In the present example, the operation "moveFolder" corresponding to a restoration operation for the above acquired operation "moveFolder" and the operation "deleteFolder" corresponding to a restoration operation for the above acquired operation "createFolder" are acquired in the recited order.

Then, based on the acquired restoration operations, the sub flow generation unit 135 may generate a restoration process content 2000 as illustrated in FIG. 13, for example. Note that "isSubFlow" of the restoration process content 2000 illustrated in FIG. 13 is defined as "true" indicating that the process content corresponds to a restoration process content. The "flowDetails" of the restoration process content 2000 illustrated in FIG. 13 includes restoration operation 2100 defining the process content of the acquired operation "moveFolder", and restoration operation 2200 defining the process content of the operation "deleteFolder".

In the following, the restoration operations 2100 and 2200 are described in greater detail. The restoration operation 2100 defines a process of moving the folder path "/folder1", which is located directly below the folder path "/folder2", to a location directly below the folder path "/" of the storage service A. In other words, the restoration operation 2100 defines a process of changing the folder path of the folder "folder1" from "/folder2/folder1" to "/folder1". The restoration operation 2200 defines a process of deleting the folder "folder2" with the folder path "/folder2" of the storage service A. By executing such restoration operations of the restoration process content 2000, the processes executed according to the operations 1101 and 1102 defined in the process content 1100 can be undone and the data in the storage service A may be restored to its original state.

Then, the sub flow generation unit 135 sends a registration request to the app management unit 120 to have the generated restoration processing content 2000 registered (step S1018). In turn, the app management unit 120 stores the generated restoration process content 2000 in the app information storage unit 190 in association with the app ID "app001" identifying the app of the job for which the error has occurred. At this time, the app management unit 120 generates a flow ID uniquely identifying the restoration process content 2000. Then, the sub flow generation unit 135 transmits the generated restoration process content 2000 to the flow execution unit 131.

Upon acquiring the restoration process content 2000 from the sub flow generation unit 135, the flow execution unit 131 executes a restoration process in accordance with the acquired restoration process content 2000 acquired (step S1019). Note that the restoration process is described in detail below.

Figure 14:
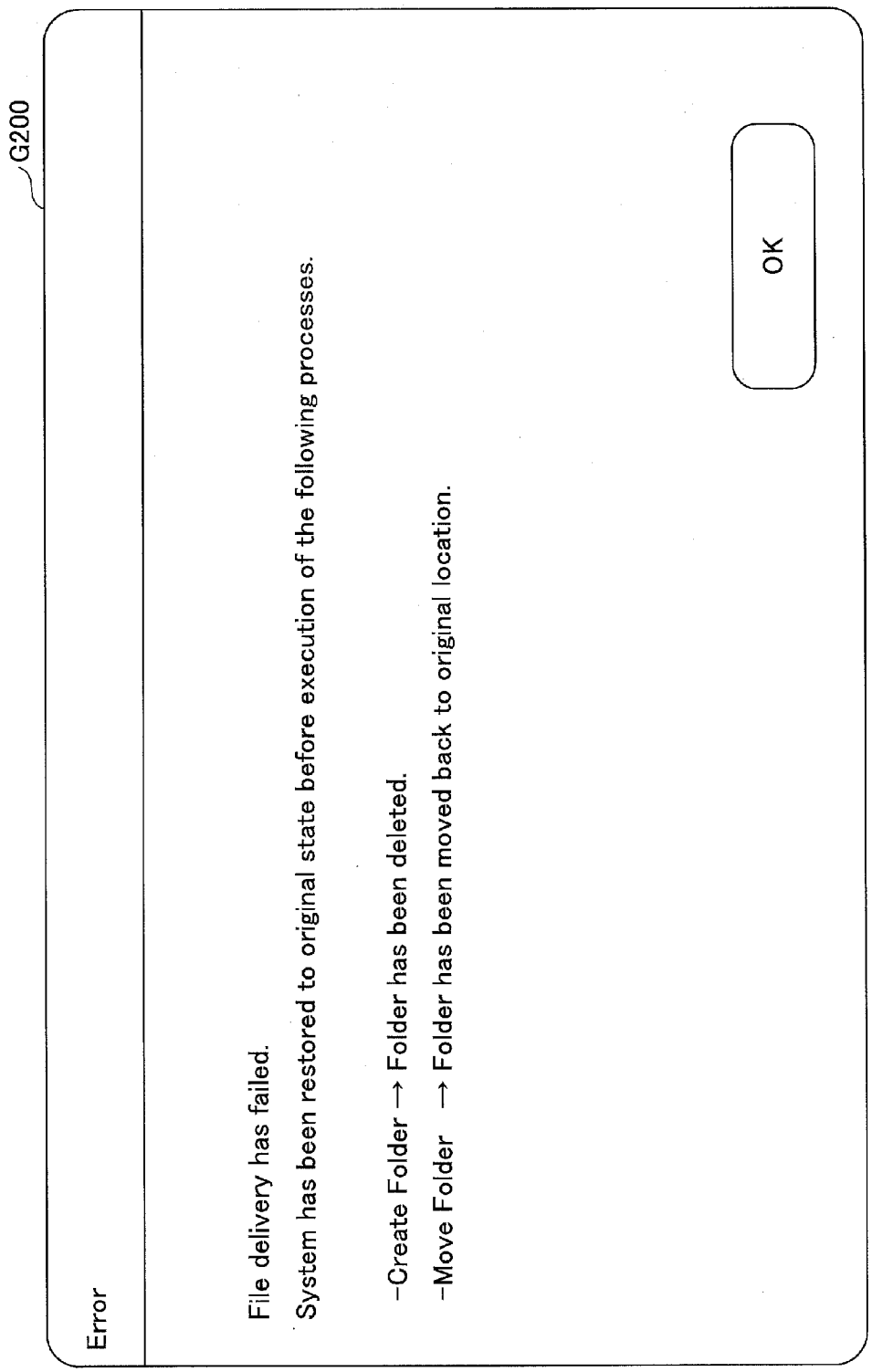
FIG. 14 illustrates an exemplary error screen.

Then, the flow execution unit 131 returns a process result of the delivery execution process indicating error information to the browser 210 of the image forming apparatus 20. Upon receiving the error information from the flow execution unit 131, the browser 210 displays an error screen G200 as illustrated in FIG. 14, for example, based on the received error information. The error screen G200 illustrated in FIG. 14 is a screen for notifying the user that a restoration process has been executed due to the occurrence of an error in the delivery execution process. In this way, the user may be informed that an error has occurred in the process of implementing the scan delivery service and that a restoration process has been executed in connection with such an error occurrence.

<<Restoration Process>>

Figure 15:
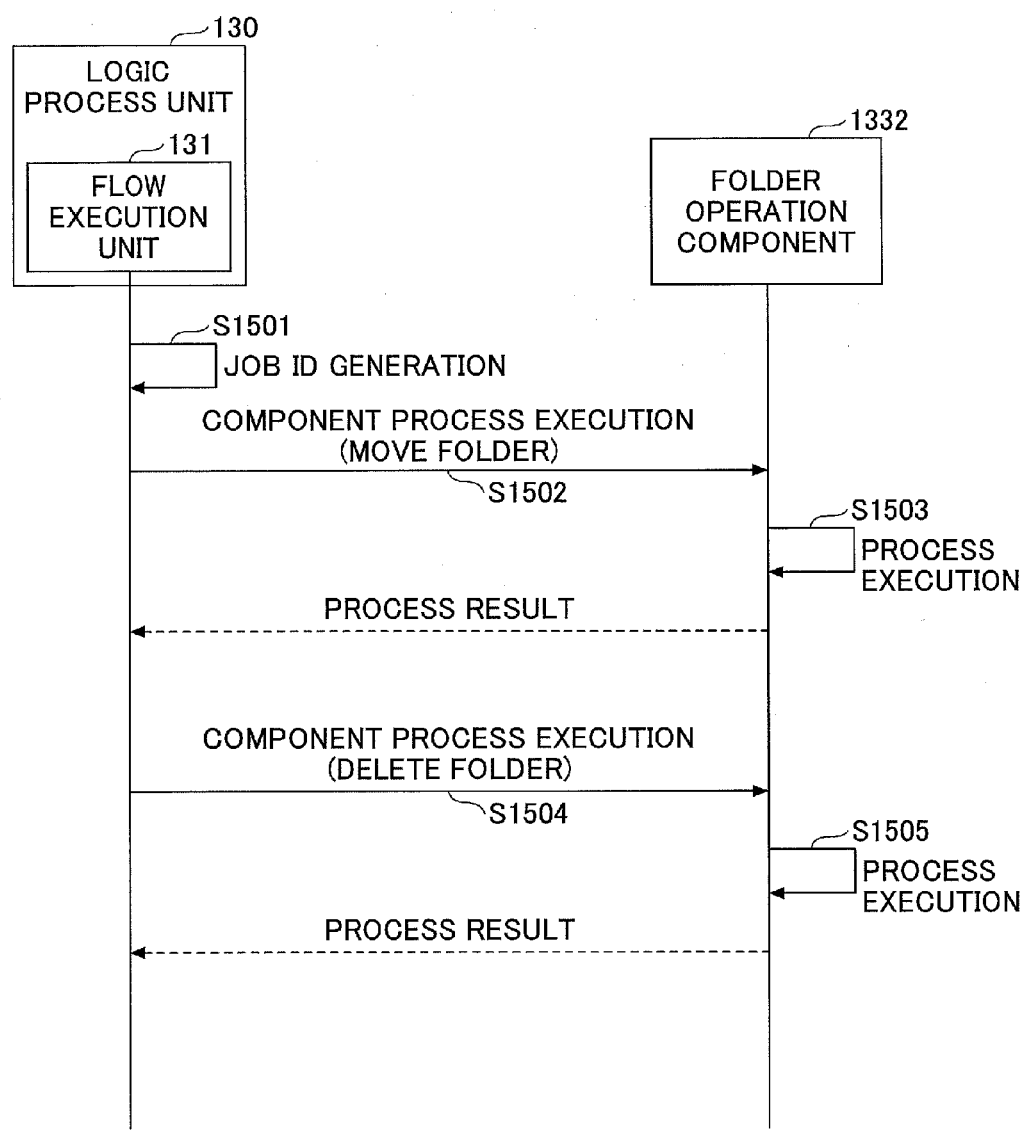
FIG. 15 is a sequence chart illustrating an exemplary restoration process according to the first embodiment.

FIG. 15 is a sequence chart illustrating exemplary process steps of the restoration process according to the first embodiment.

First, the flow execution unit 131 generates a job ID for uniquely identifying a job to be executed based on the restoration process content 2000 acquired from the sub flow generation unit 135 (step S1501).

Then, based on the restoration operation 2100 defined in the restoration process content 2000 illustrated in FIG. 13, the flow execution unit 131 sends a component process execution request (to move a folder) to the folder operation component 1332 (step S1502). That is, the flow execution unit 131 designates the folder path "/folder2/folder1" corresponding to the original location and the folder path "/folder1" corresponding to the moving destination in the component process execution request, and sends the component process execution request to the folder operation component 1332.

Then, the folder operation component 1332 executes the corresponding component process (step S1503). That is, the folder operation component 1332 moves the folder with the folder path "/folder2/folder1" in the storage service A to a location directly below the folder with the folder path "/" (i.e., the folder path is changed from "/folder2/folder1" to "/folder1"). Then, the folder operation component 1332 returns a process result of the process to the flow execution unit 131.

More specifically, the folder operation component 1332 requests the file process unit $170_1$ of the storage service A cooperation unit $160_1$ to move the folder using an API for moving a folder that is defined as the common I/F $171_1$. That is, the folder operation component 1332 may use the API "externalservicename/process/move_folder" indicated in FIG. 5A, for example, to designate "service-a/process/move_folder?from=/folder2/folder1&to=/folder1". In this way, the folder "folder1" with the folder path "/folder2/folder1" in the storage service A may be moved directly below the folder with the folder path "/".

Then, based on the restoration operation 2200 defined in the restoration process content 2000 illustrated in FIG. 13, the flow execution unit 131 sends a component execution request (to delete a folder) to the folder operation component 1332 (step S1504). That is, the flow execution unit 131 designates the folder path "/folder2" of the folder to be deleted in the component process execution request, and sends the component process execution request to the folder operation component 1332.

In turn, the folder operation component 1332 executes the corresponding component process (step S1505). That is, the folder operation component 1332 deletes the folder "folder2" with the folder path "/folder2" in the storage service A. Then, the folder operation component 1332 returns a process result of the process to the flow execution unit 131.

More specifically, the folder operation component 1332 requests the file process unit $170_1$ of the storage service A cooperation unit $160_1$ to delete a folder using an API for deleting a folder that is defined as the common I/F $171_1$. That is, the folder operation component 1332 may use the API "externalservicename/process/delete_folder" indicated in FIG. 5A, for example, to designate "service-a/process/delete_folder?path=/folder2". In this way, the folder "folder2" with the folder path "/folder2" in the storage service A may be deleted.

By executing the above process steps, the restoration process according to the present embodiment may be completed. In this way, even when a series of processes is not properly completed due to the occurrence of an error or the like in one of the component processes that are executed according to operations defined in the process content of the series of processes, a change made to the external storage system 30 (e.g., change resulting from a folder operation) may be reverted back to its original state.

Second Embodiment

In the following, a second embodiment of the present invention is described. In the service providing system 10 according to the second embodiment, when a job is executed based on a restoration process content and an error occurs because an external service is temporarily unavailable, for example, the job may be executed based on the restoration process content after a predetermined time period elapses.

Also, in the service providing system 10 according to the second embodiment, when an error occurs while executing a job based on a restoration process content, a determination is made as to whether the error can be skipped (i.e., whether the error can be ignored). In the following, features and elements having the same functions or perming the same processes are those of the first embodiment are given the same reference numerals and descriptions thereof may be omitted.

<Software Configuration>

Figure 16:
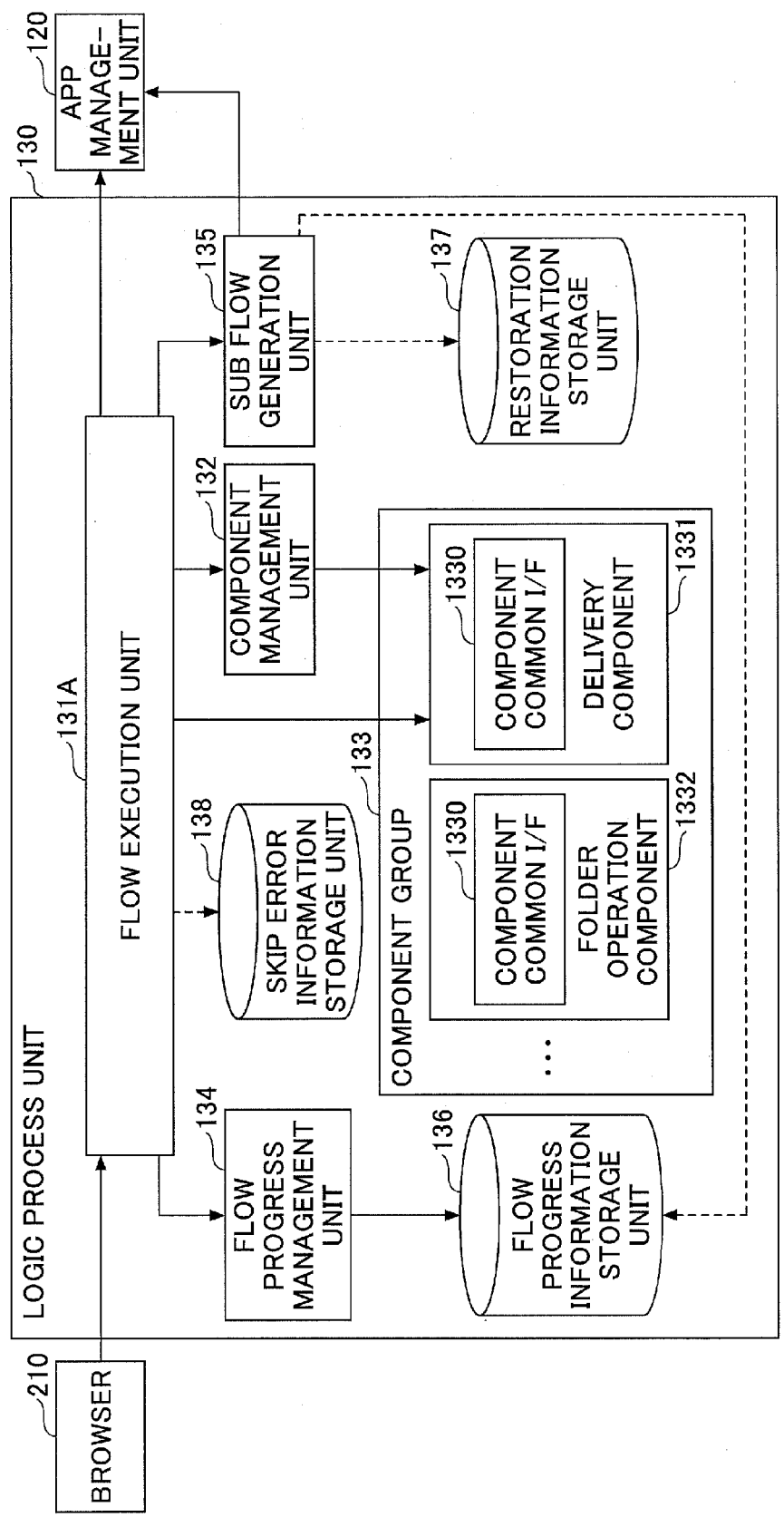
FIG. 16 is a block diagram illustrating an exemplary functional configuration of the logic process unit according to a second embodiment of the present invention.

In the following, the functional configuration of the logic process unit 130 of the service providing system 10 according to the second embodiment is described with reference to FIG. 16. FIG. 16 is a block diagram illustrating an exemplary functional configuration of the logic process unit 130 according to the second embodiment. The logic process unit 130 of the service providing system 10 according to the second embodiment includes a flow execution unit 131A, and a skip error information storage unit 138.

When an error occurs indicating that a storage service is temporarily unavailable while a process is executed according to a restoration operation defined in a restoration process content, the flow execution unit 131A re-executes the job based on the restoration process content after a predetermined time period elapses.

Also, when an error occurs in a process that is executed according to a restoration operation defined in a restoration process content, the flow execution unit 131A refers to a skip error information table 1381 to determine whether the error that has occurred can be skipped (ignored). Note that in the present descriptions, an error that can be skipped means an error that does not necessarily have to be addressed or dealt with.

The skip error information storage unit 138 stores the skip error information table 1381. The skip error information table 1381 manages error information (skip error information) with respect to each operation defined in a restoration process content, the error information relating to one or more errors that does not have to be addressed in a component executed according to the operation. Note that the skip error information table 1381 is described in detail below.

<Process Details>

<<Delivery Execution Process>>

Figure 17:
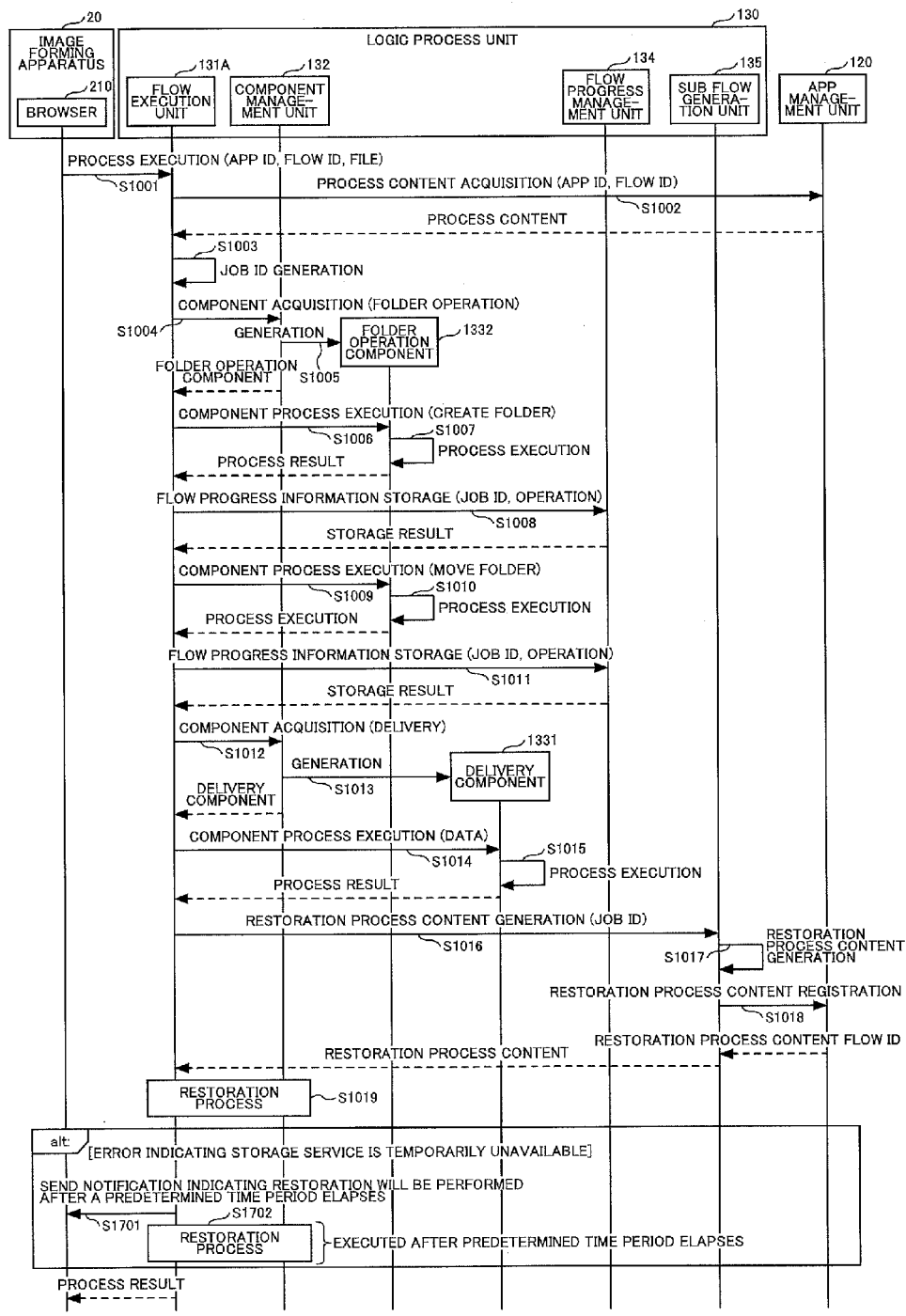
FIG. 17 is a sequence chart illustrating an exemplary delivery execution process according to the second embodiment.

In the following, the delivery execution processing according to the second embodiment is described with reference to FIG. 17. FIG. 17 is a sequence chart illustrating exemplary process steps of a delivery execution process according to the second embodiment. In FIG. 17, it is assumed that in the restoration process in step S1019, an error has occurred indicating that the storage service A is temporarily unavailable, and the flow execution unit 131A receives error information relating to the error that has occurred. Note that an error indicating that the storage service A is temporarily unavailable may include, for example, an error that occurs in a case where the storage service A is unavailable due to a temporary concentration of access to the external storage system $30_1$ providing the storage service A.

At this time, the flow execution unit 131A notifies the browser 210 of the image forming apparatus 20 that the restoration process is to be re-executed after a predetermined time period elapses (step S1701). Then, after the predetermined time period elapses, the flow execution unit 131A re-executes the restoration process (step S1702). Thus, in the service providing system 10 according to the present embodiment, even when an error occurs indicating that a storage service is temporarily unavailable while executing a restoration process, the restoration process may be re-executed after a predetermined time period has elapsed.

<<Restoration Process>>

Figure 18:
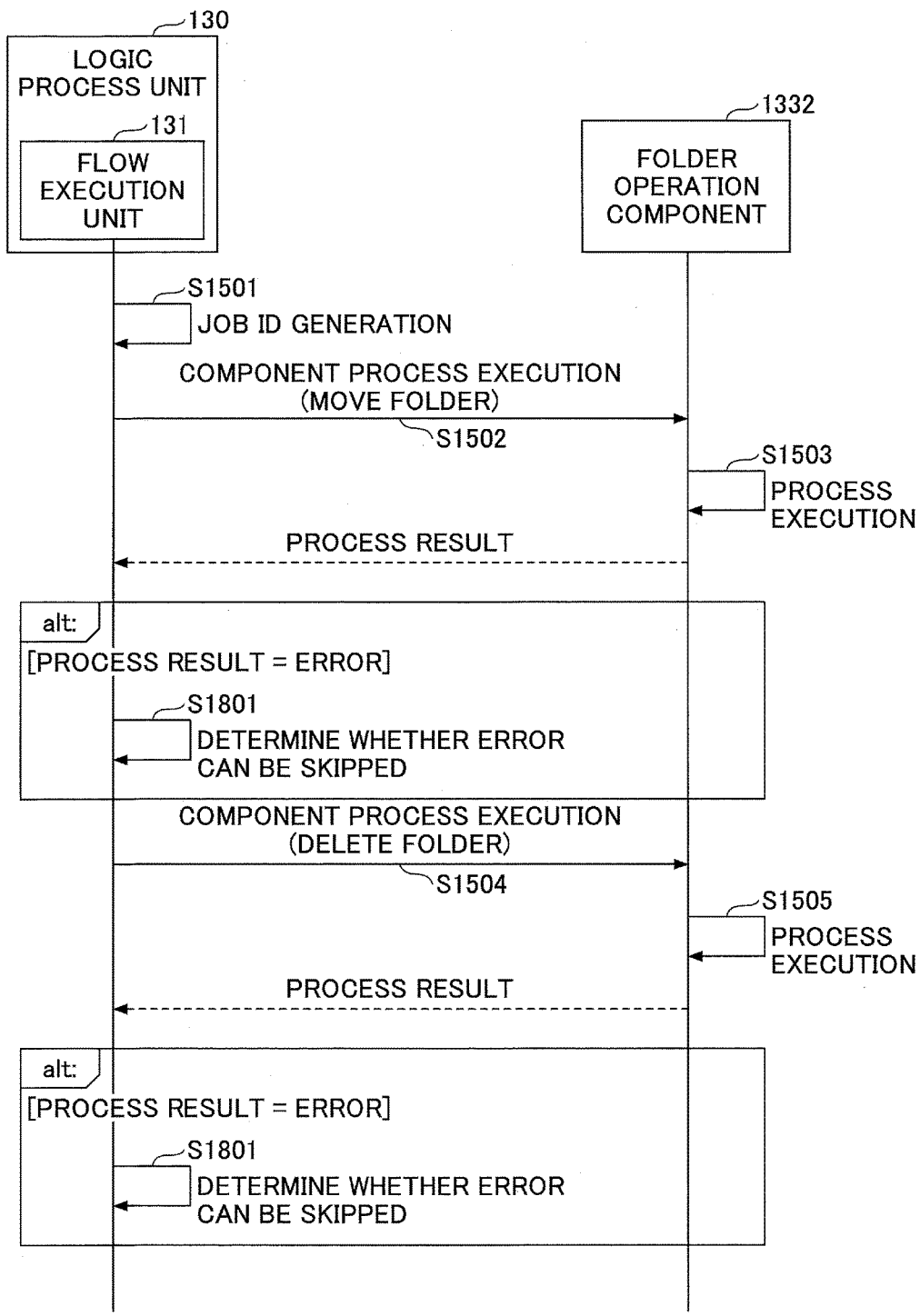
FIG. 18 is a sequence chart illustrating an exemplary restoration process according to the second embodiment.

In the following, the restoration process according to the second embodiment is described with reference to FIG. 18. FIG. 18 is a sequence chart illustrating exemplary process steps of the restoration process according to the second embodiment.

Upon receiving a process result indicating error information from the folder operation component 1332, the flow execution unit 131A refers to the skip error information table 1381 to determine whether the error represented by the error information corresponds to an error that can be skipped (step S1801). Then, if it is determined that the error can be skipped, the flow execution unit 131A executes the subsequent process steps. On the other hand, if it is determined that the error cannot be skipped, the flow execution unit 131A terminates the restoration process (abnormal termination).

In the following, the skip error information table 1381 is described with reference to FIG. 19. FIG. 19 is a table illustrating an example of the skip error information table 1381. The skip error information table 1381 illustrated in FIG. 19 defines skip error information relating to an error that can be skipped with respect to each restoration operation. For example, the first record of FIG. 19 indicates that when an error corresponding to the error information "folder_not_exist" occurs while executing a process of the folder operation component 1332 designating the restoration operation "deleteFolder", the error can be skipped. That is, an error indicating that a folder to be deleted does not exist that occurs while executing the restoration operation "deleteFolder" does not have to be addressed (i.e., no restoration operation is required). Thus, in the service providing system 10 according to the present embodiment, when an error that can be skipped (error that does not have to be addressed) occurs while executing a restoration process, the error may be ignored and the process may proceed to subsequent process steps.

Third Embodiment

In the following, a third embodiment of the present invention is described. The service providing system 10 according to the third embodiment executes a job based on a restoration operation that is selected from among the restoration operations defined in a restoration process content by a user of the image forming apparatus 20. In the following, features and elements having substantially the same functions or performing substantially the same processes as those of the first embodiment are given the same reference numerals and descriptions thereof may be omitted.

<Process Details>

<<Delivery Execution Process>>

Figure 20:
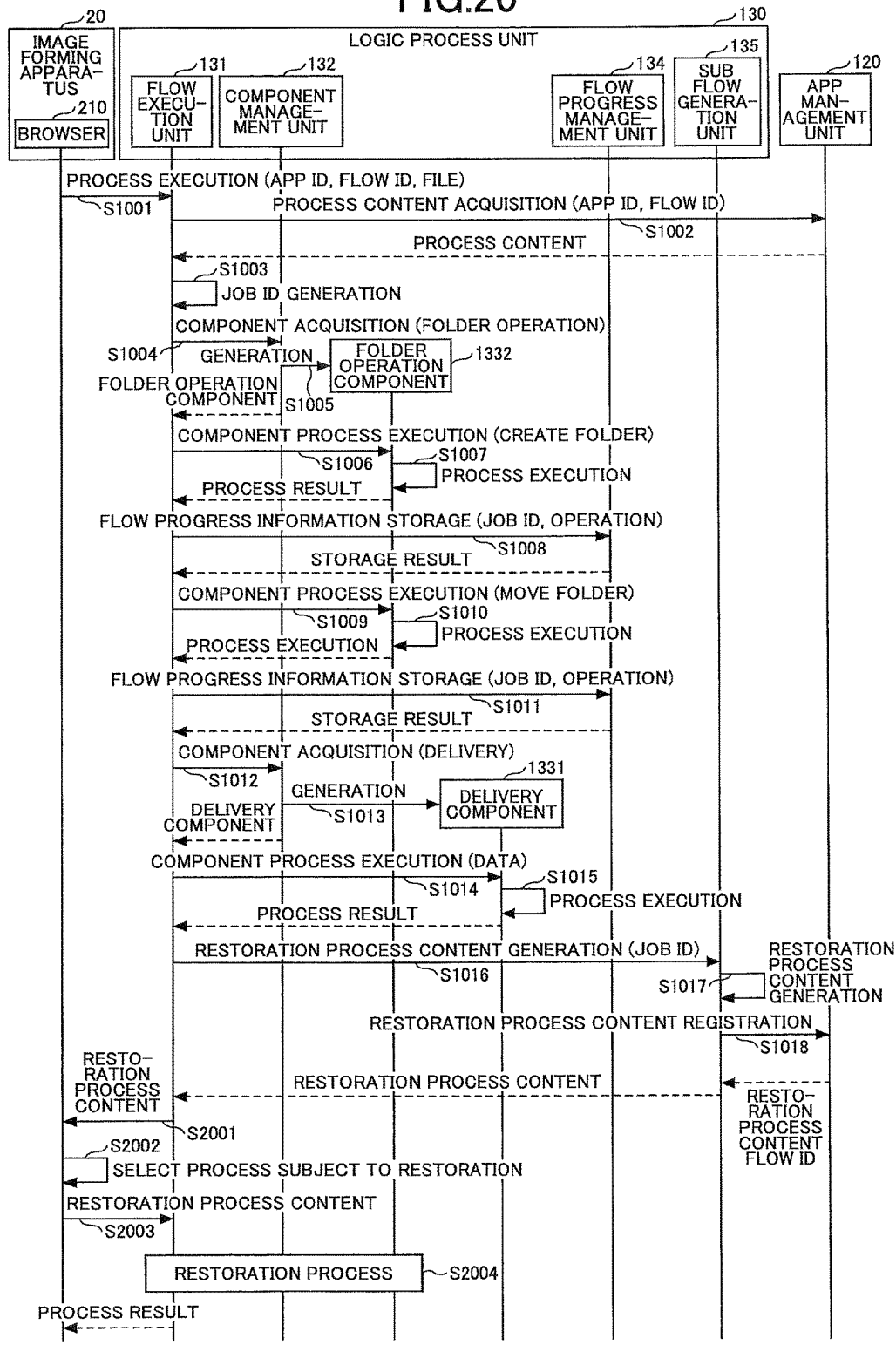
FIG. 20 is a sequence chart illustrating an exemplary delivery execution process according to a third embodiment of the present invention.

FIG. 20 is a sequence chart illustrating exemplary process steps of the delivery execution process according to the third embodiment.

Upon receiving the restoration process content 2000 generated by the sub flow generation unit 135, the flow execution unit 131 transmits the restoration processing content 2000 to the browser 210 of the image forming apparatus 20 (step S2001).

Figure 21:
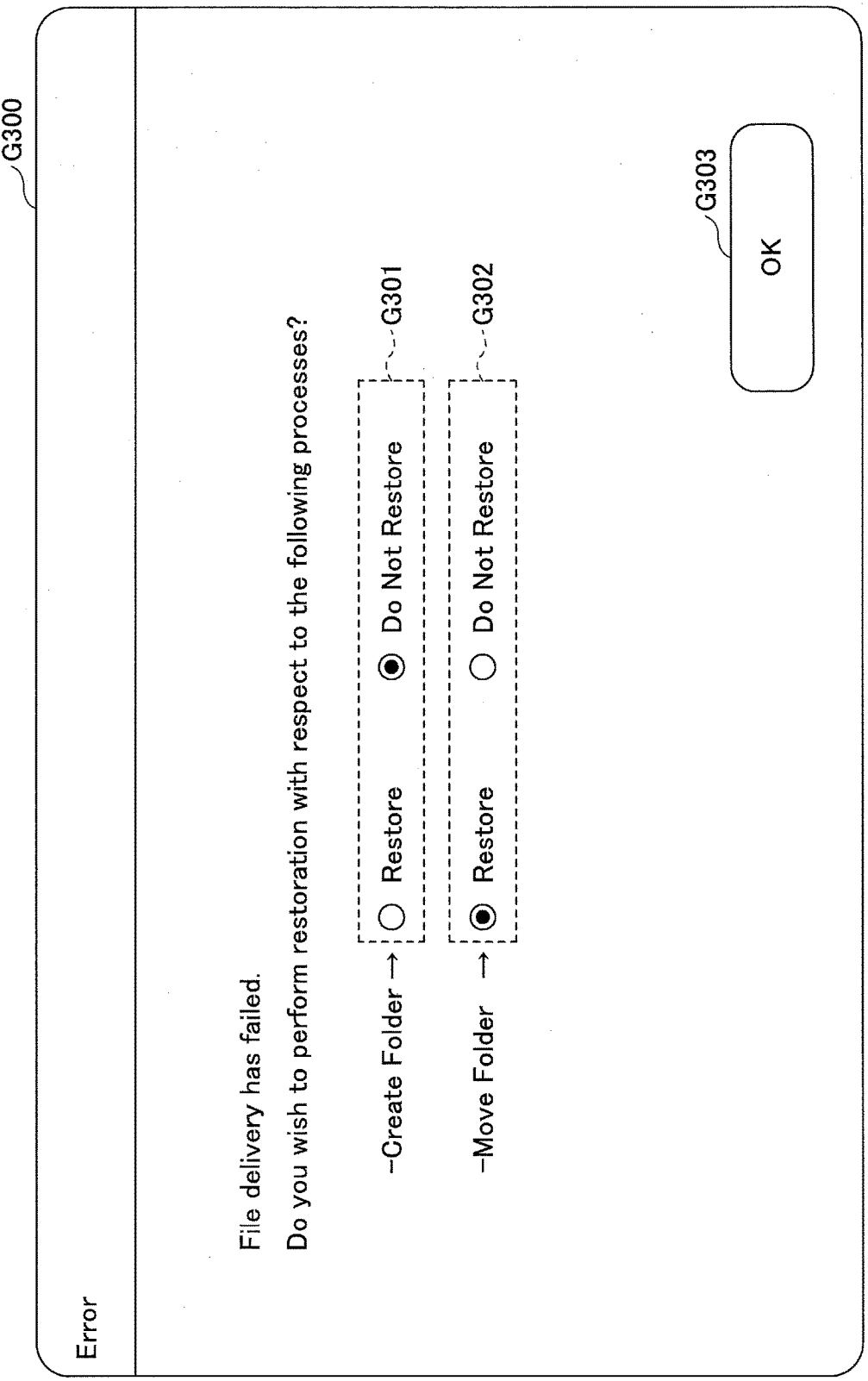
FIG. 21 illustrates another exemplary error screen.

Then, the browser 210 displays an error screen G300 as illustrated in FIG. 21, for example, in order to prompt a user to select a restoration operation to be executed from among the restoration operations defined in the received restoration process content 2000. Then, the user selects an operation to be subject to a restoration operation at the error screen G300 illustrated in FIG. 21 (step S2002). That is, if the user selects "restore" at a selection field G301 of the error screen G300 the restoration operation 2200 will be executed. On the other hand, if the user selects "do not to restore" at the selection field G301, the restoration operation 2200 will not be executed. Similarly, if the user selects "restore" at a selection field G302 of the error screen G300, the restoration operation 2100 will be executed, whereas if the user selects "do not restore" at the selection field G302, the restoration operation 2100 will not be executed.

In the illustrated example, it is assumed that the user has selected "do not restore" at the selection field G301 and the user has selected "restore" at the selection field G302. In this case, the image forming apparatus 20 generates a restoration process content 3000 as illustrated in FIG. 22, for example, based on the received restoration process content 2000. That is, the image forming apparatus 20 generates the restoration operation content 300 including an execution necessity classification 3100 indicating whether to execute the restoration operation 2100 and an execution necessity classification 3200 indicating whether to execute the restoration operation 2200 in addition to the items of the restoration process content 2000. In the illustrated example, "doRollback:true" id defined as the execution necessity classification 3100 indicating that the restoration operation 2100 is to be execute, and "doRollback:false" is defined as the execution necessity classification 3200 indicating that the restoration operation 2200 is not to be executed.

Then, the browser 210 of the image forming apparatus 20 transmits the restoration process content 3000 to the flow execution unit 131 (step S2003). Then, the flow execution unit 131 executes a restoration process according to the restoration operations and the execution necessity classifications defined in the restoration process content 3000 (step S2004). That is, the flow execution unit 131 executes a process according to the restoration operation 2100 defined in the restoration process content 3000, but does not execute the process according to the restore operation 2200 defined in the restoration process content 3000. Thus, in the present embodiment, a process is executed according to a restoration operation that is selected by a user from among the restoration operations defined in restoration process content.

Fourth Embodiment

In the following, a fourth embodiment of the present invention is described. Note that typically, when an error or the like occurs in the course of executing a series of processes, the series of processes have to be executed all over again from the beginning. In other words, if an error or the like occurs in the course of executing a series of processes, it has not been possible to resume execution from the process in which the error has occurred. In this respect, the service providing system 10 according to the fourth embodiment is configured to enable resumption of the execution of a series of processes. In the following, features and elements having substantially the same function or performing substantially the same processes as those of the first embodiment are given the same reference numerals and descriptions thereof may be omitted.

Note that in the descriptions below, it is assumed that the service providing system 10 according to the present embodiment provides a scan delivery service that involves performing an OCR process on an electronic file that has been generated by the image forming apparatus 20 of the user environment E2 through scanning a document, and storing the resulting processed electronic file in the external storage system 30.

<Software Configuration>

Figure 23:
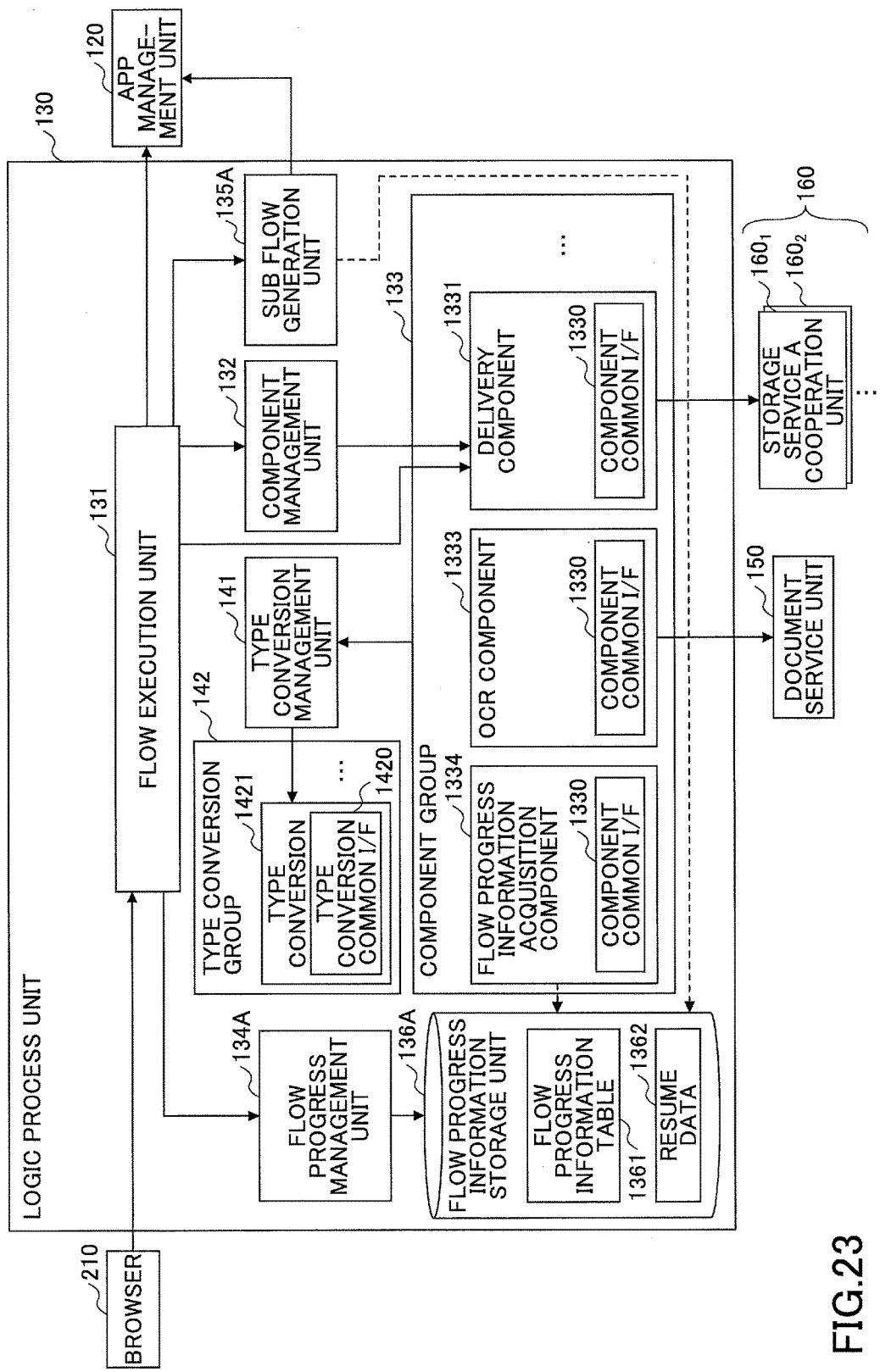
FIG. 23 is a block diagram illustrating an exemplary functional configuration of the logic process unit according to a fourth embodiment of the present invention.

In the following, the functional configuration of the logic process unit 130 according to the present embodiment is described with reference to FIG. 23. FIG. 23 is a process block diagram illustrating an exemplary functional configuration of the logic process unit 130 according to the fourth embodiment. Note process blocks of the information processing system 1 according to the present embodiment that are substantially the same as those of the first embodiment are given the same reference numerals and descriptions thereof may be omitted.

The logic process unit 130 according to the present embodiment includes a flow progress management unit 134A, a sub flow generation unit 135A, a flow progress information storage unit 136A, a type conversion management unit 141, and a type conversion group 142.

Also, the component group 133 according to the present embodiment further includes an OCR component 1333 for performing an OCR process on an electronic file. The component group 133 according to the present embodiment further includes a flow progress information acquisition component 1334 for acquiring from the flow progress information storage unit 136A information for resuming execution of the process in which an error or the like has occurred. Note that the component group 133 according to the present embodiment may include other components in addition to the above components such as an authentication component for acquiring authentication information for using the external storage system 30, for example.

The type conversion management unit 141 manages type conversion of data types. Note that in the present embodiment, the data type that can be handled by each component included in the component group 133 is determined in advance. Thus, the type conversion management unit 141 generates a type conversion defined in the type conversion group 142 in response to a request from a component, and sends a process execution request to the generated type conversion to execute a relevant type conversion process. Note that in the present descriptions, type conversion refers to a module or the like for executing a relevant type conversion process for converting the data type of data, and may be defined by a class or function, for example.

Note that generating a type conversion may mean loading a type conversion defined by a class into a memory (e.g., RAM 14), for example. Also, examples of data types include "InputStream" referring to stream data, "LocalFilePath" referring to a path (address) of an electronic file stored in a storage device or the like, and "File" referring to an electronic file itself.

The type conversion group 142 corresponds to a group of type conversions. The type conversion group 142 includes a type conversion 1421 for converting the data type "InputStream" to the data type "LocalFilePath". Note that the type conversion included in the type conversion group 142 is not limited thereto and may also include a type conversion for converting the data type "LocalFilePath" to the data type "File", for example.

Further, each type conversion includes a type conversion common I/F 1420. The type conversion common I/F 1420 is an API that is commonly defined in each type conversion, and includes an API for generating a type conversion and an API for requesting the type conversion to execute a type conversion process. By providing each type conversion with the type conversion common I/F 1420 as described above, the impact of adding a type conversion may be localized, for example. Thus, the number of steps required for the development of an additional type conversion may be reduced, for example.

Note that the logic process unit 130 according to the first to third embodiments described above may also include the type conversion management unit 141 and the type conversion group 142.

Upon receiving flow progress information from the flow execution unit 131, the flow progress management unit 134A stores information included in the received flow progress information in the flow progress information storage unit 136A. Note that the flow progress information according to the present embodiment includes data output as a process result of a component that has been properly executed (completed) in addition to a job ID and an operation name.

When an error or the like occurs in a process of a component that is executed according to an operation defined in process content of a series of processes (i.e., when one of the processes is abnormally terminated), the sub flow generation unit 135A generates process content for resuming execution of the process of the component that has failed (the process that was abnormally terminated due to an error occurrence or the like). The sub flow generation unit 135A stores the generated process content in the app information storage unit 190 via the app management unit 120.

The flow progress information storage unit 136A further stores resume data 1362. The resume data 1362 corresponds to data output as a process result of a component that has been properly executed (completed). In this way, execution of the process may be resumed by executing the process content generated by the sub flow generation unit 135A with respect to the resume data 1362.

As described above, the service providing system 10 according to the present embodiment manages the execution statuses of the operations defined in process content, and also stores a process result of an operation that has been properly executed as resume data 1362. Accordingly, when an error or the like occurs in a process of a component that is executed according to an operation defined in process content of a series of processes, the service providing system 10 of the present embodiment may resume execution of the process of the component that has failed (process that was abnormally terminated due to an error occurrence or the like).

<Process Details>

In the following, processes implemented by the information processing system 1 according to the present embodiment are described.

<<Scan Delivery Service Overall Process>>

Figure 24:
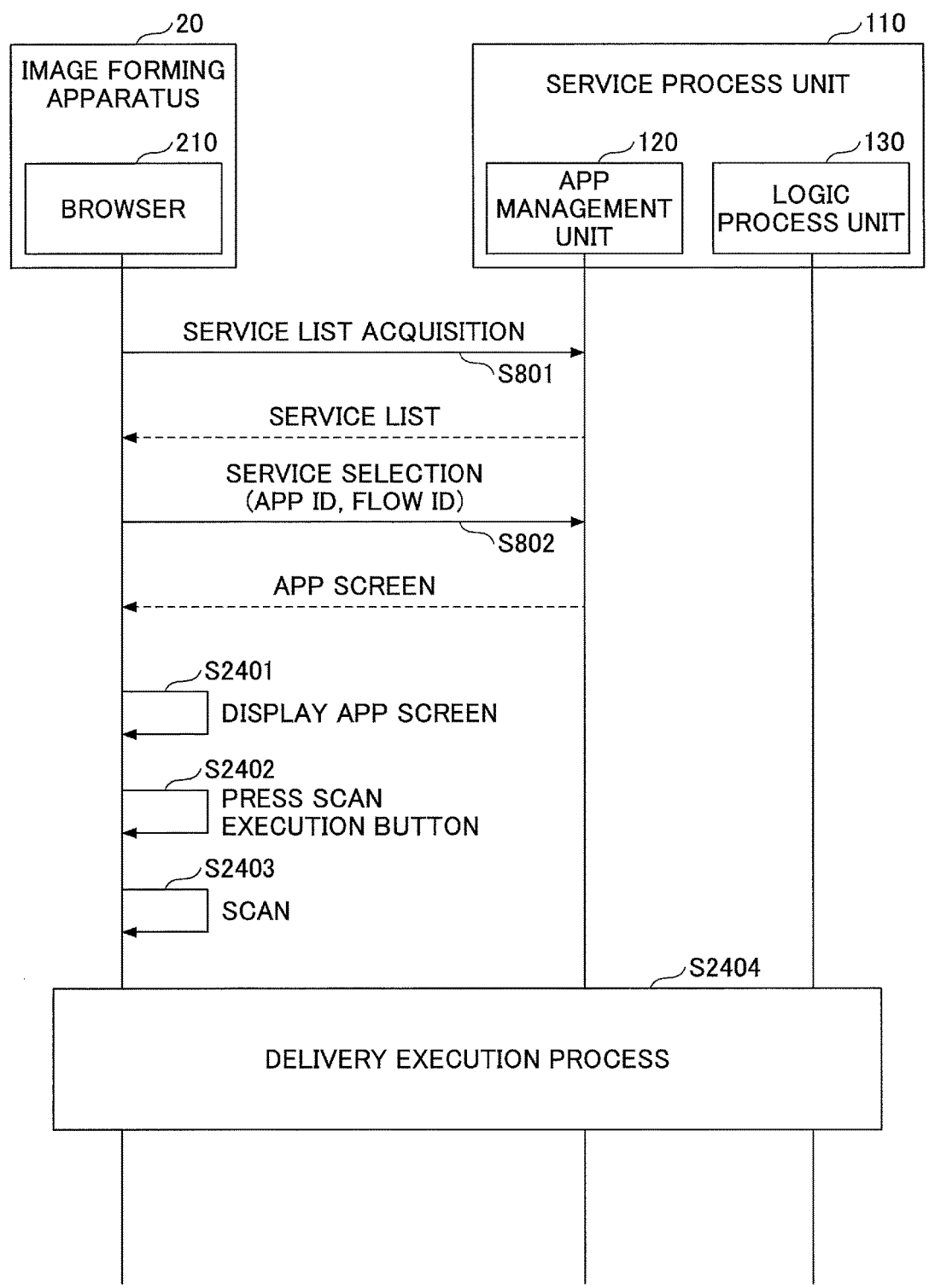
FIG. 24 is a sequence chart illustrating an exemplary overall process of the scan delivery service according to a fourth embodiment of the present invention.

The following is a description of an overall process that is implemented in a case where a user of the image forming apparatus 20 uses the scan delivery service according to the present embodiment. FIG. 24 is a sequence chart illustrating an exemplary overall process of the scan delivery service according to the fourth embodiment.

Figure 25:
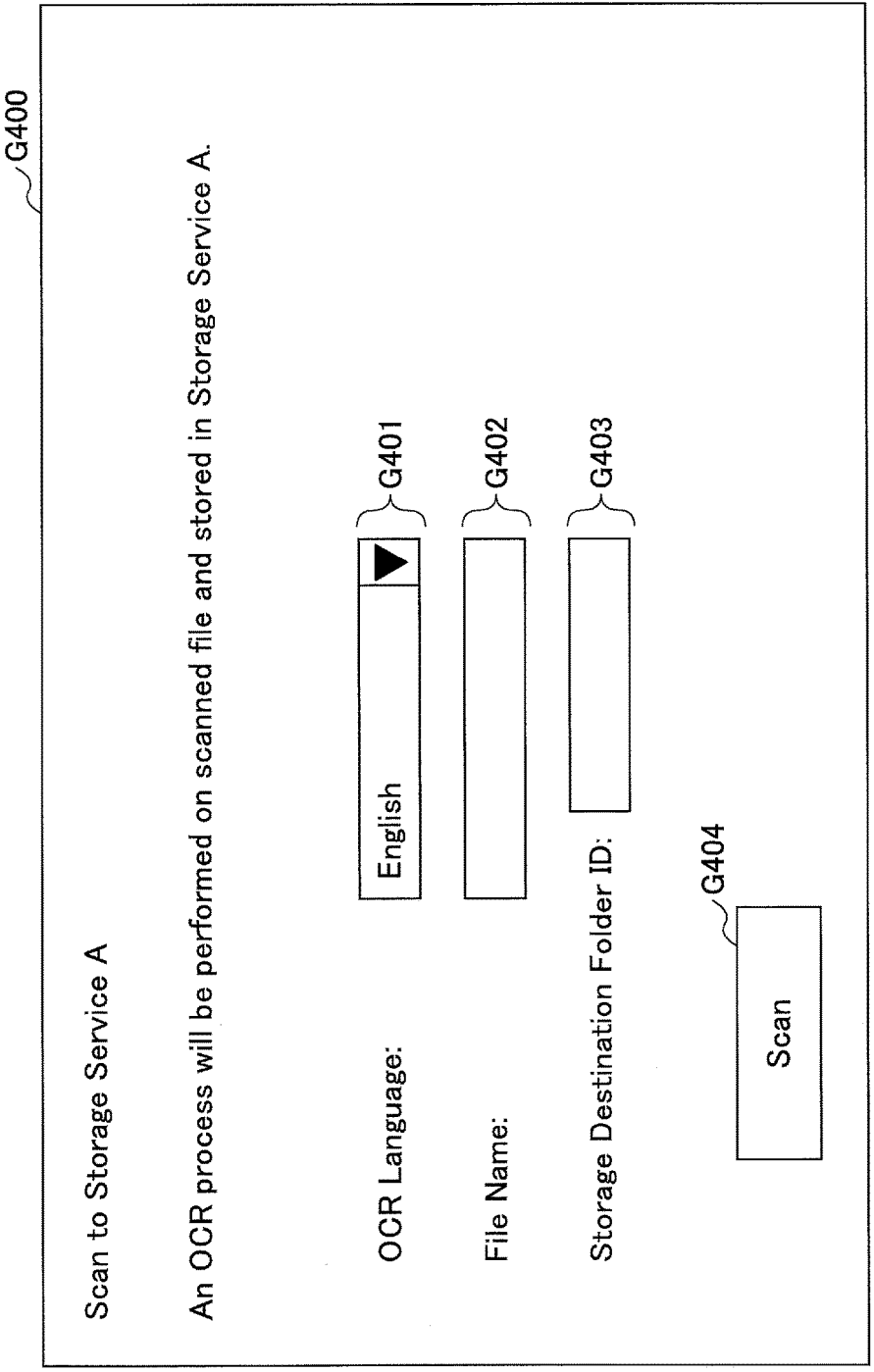
FIG. 25 illustrates another exemplary application screen for using the scan delivery service.

When the browser 210 receives an app screen received from the app management unit 120, the browser 210 may display an app screen G400 as illustrated in FIG. 25, for example, on the operation panel 22 (step S2401). FIG. 25 illustrates an exemplary app screen G400 for using a scan delivery service to perform scan delivery according to the present embodiment.

Then, the user enters a desired file name to be assigned to an electronic file to be generated by a scanning operation in a file name input field G402 of the app screen G400 illustrated in FIG. 25. Also, the user enters a folder ID of a folder of the storage service A that is to be the storage destination of the electronic file to be generated by the scanning operation in a storage destination folder ID input field G403. Note that in the app screen G400 illustrated in FIG. 25, "English" is selected as the OCR language at an OCR language selection field G401 indicating that an OCR process is to be performed in English. However, the user may be allowed to select some other desired language.

Also, note that in the app screen G400 illustrated in FIG. 25, the user is prompted to directly enter a folder ID of a folder of the storage service A in the storage destination folder ID input field G403. However, the user may alternatively be prompted to select a storage destination folder from a folder list, for example. That is, in some embodiments, the data I/F unit 140 may acquire a list of folders of the storage service A via the data process unit 180, for example, and the user may be prompted to select a storage destination folder from the acquired folder list.

Then, the user sets a document on the scanner 25 of the image forming apparatus 20 and presses a scan execution button G404 of the app screen G400. In turn, the browser 210 accepts the pressing of the scan execution button G404 (step S2402). In this way, the document may be scanned by the scanner 25 of the image forming apparatus 20, and an electronic file with the file name that was entered in the file name input field G402 may be generated (step S2403).

Then, the image forming apparatus 20 performs a delivery execution process for delivering the generated electronic file to the storage service A (step S2404). The delivery execution process is described in detail below with reference to FIG. 26. Note, however, that the delivery execution process of FIG. 26 illustrates an exemplary case where a process of delivering (uploading) an electronic file to the storage service A ends in failure (error).

<<Delivery Execution Process>>

Figure 26:
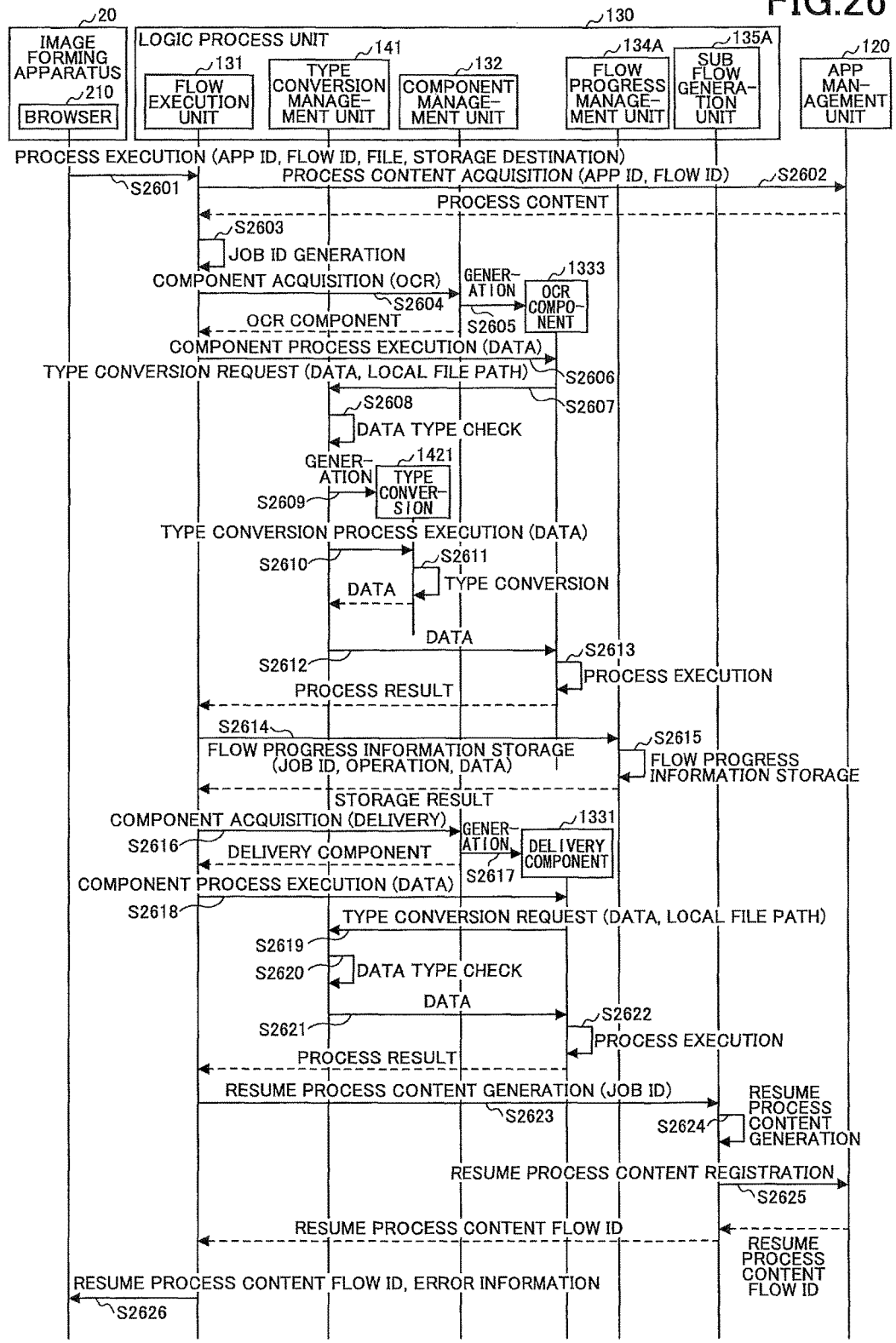
FIG. 26 is a sequence chart illustrating an exemplary delivery execution process according to the fourth embodiment.

FIG. 26 is a sequence chart illustrating an exemplary delivery execution process according to the fourth embodiment.

First, the browser 210 transmits a process execution request for executing a scan delivery service to the flow execution unit 131 (step S2601). Note that in the present example, it is assumed that the relevant process execution request includes the app ID "app001" and a flow ID "flow2" of process content indicating information relating to a series of processes for implementing the scan delivery service according to the present embodiment. Also, the relevant execution request includes an electronic file generated by a scanning operation and a folder ID of a storage destination folder.

Upon receiving the process execution request, the flow execution unit 131 acquires process content of a flow with the flow ID "flow2" from the app information 1000₁ with the app ID "app001" included in the received process execution request via the application management unit 120 (step S2602).

FIG. 27 illustrates process content 1200 (with the flow ID "flow2") acquired from the app information 1000₁. That is, FIG. 27 illustrates another example of process content.

The process content 1200 illustrated in FIG. 27 indicates information relating to a series of processes that includes performing an OCR process on an electronic file generated by a scanning operation, and delivering the processed file to a designated folder of the storage service A. Note that the flow ID "flow2" uniquely identifying the process content in the app information 1000₁ is defined as the "flowId" in the process content 1200 illustrated in FIG. 27. Also, operations 1201 and 1202 are defined in the "flowDetails" of the process content 1200 illustrated in FIG. 27.

The process content illustrated in FIG. 27 1200 defines the operation 1201 for executing an OCR process, and the operation 1202 for delivering (uploading) data to the storage service A. More specifically, the operation 1201 defines a process of performing an OCR process in English and outputting the process result in PDF format. Also, the operation 1202 defines a process of delivering (uploading) an electronic file into a folder with a designated folder ID in the storage service A.

Note that the process content 1200 illustrated in FIG. 27 is one illustrative example of process content for implementing the scan delivery service according to the present embodiment. The scan delivery service according to the present embodiment may also be implemented by a series of processes including other various processes implemented by one or more programs included in the document service unit 150, for example. In one example, the scan delivery service according to the present embodiment may be implemented by a series of processes that include executing an OCR process on a scanned electronic file, translating the OCR processed file into Japanese, and delivering the translated electronic file to a designated folder of the storage service A.

Referring back to FIG. 26, the flow execution unit 131 generates a job ID for uniquely identifying the job to be executed based on the process content 1200 acquired in step S2602 (step S2603). In the present example, it is assumed that the job ID "Job101" has been generated by the flow execution unit 131.

Then, the flow execution unit 131 sends a component acquisition request to the component management unit 132 according to an operation defined in the acquired process content 1200 (step S2604). More specifically, based on the operation 1201 of the process content 1200 illustrated in FIG. 27, the flow execution unit 131 sends a component acquisition request to the component management unit 132 to acquire the OCR component 1333.

Upon receiving the component acquisition request from the flow execution unit 131, the component management unit 132 generates the OCR component 1333 (step S2605). Note that the OCR component 1333 can be generated using an API for generating a component defined in the component common I/F 1330. Then, when the OCR component 1333 is generated, the component management unit 132 returns the generated OCR component 1333 to the flow execution unit 131. For example, the component management unit 132 may return an address in a memory (e.g., RAM 14) where the OCR component 1333 has been loaded to the flow execution unit 131.

The flow execution unit 131 designates data in a process execution request and sends the process execution request to the generated OCR component 1333 (step S2606). In the present example, it is assumed that the data type of the data designated by the flow execution unit 131 corresponds to an "InputStream" type electronic file that has been handed over from the browser 210. That is, the flow execution unit 131 receives the electronic file from the browse 210 as the data type "InputStream" and hands the received electronic file as "data" to the OCR component 1333 to request for the execution of a relevant component process.

The OCR component 1333 sends a type conversion request to the type conversion management unit 141 (step S2607). In the present example, the type conversion request includes data and a designation of the data type "LocalFilePath" indicating the data type that can be handled by the OCR component 1333.

The type conversion management unit 141 checks whether the data type of the data that is included in the received type conversion request matches the data type designated in the type conversion request (step S2608). In the present example, the data type of the data included in the type conversion request is "InputStream", whereas the data type designated in the type conversion request is "LocalFilePath". Thus, the type conversion management unit 141 determines that the data type of the data and the designated data type do not match.

In turn, the type conversion management unit 141 generates the type conversion 1421 for converting the data type from "InputStream" to "LocalFilePath" (step S2609).

Then, the type conversion management unit 141 designates the data in a type conversion process execution request and sends the type conversion process execution request to the generated type conversion 1421 (step S2610). In turn, the type conversion 1421 converts the data type of the designated data from "InputStream" to "LocalFilePath" (step S2611), and returns the converted data to the type conversion management unit 141. Then, the type conversion management unit 141 transmits the converted data to the OCR component 1333 (step S2612).

Upon receiving the converted data, the OCR component 1333 executes a relevant component process (step S2613). That is, OCR component 1333 executes an OCR process on an electronic file that is represented by data of the data type "LocalFilePath" (i.e., path or address).

More specifically, in the present example, the OCR component 1333 sends a process execution request to the OCR process 151 of the document service unit 150, and the OCR process 151 executes the relevant process on electronic file. Then, the OCR component 1333 returns a process result of the executed process to flow execution unit 131. Note that the process result returned to the flow execution unit 131 in the present example corresponds to OCR-processed data. Also, the OCR-processed data is represented by a path or an address of a corresponding electronic file (i.e., the data type of the OCR-processed data is "LocalFilePath").

Then, the flow execution unit 131 sends a flow progress information storage request to the flow progress management unit 134A (step S2614). In the present example, the flow progress information includes the job ID "Job101" generated in step S2603, an operation name "ocr" of the operation 1201 corresponding to the OCR component 1333 that has been executed, and the OCR-processed data.

Then, the flow progress management unit 134A updates the flow progress information table 1361 of the flow progress information storage unit 136A based on the job ID and the operation name included in the flow progress information. Also, the flow progress management unit 134A stores processed data resulting from the process executed by the relevant component as resume data 1362 in the flow progress information storage unit 136A (step S2615).

More specifically, based on the job ID "Job101" and the operation name "ocr" included in the flow progress information, the flow progress management unit 134A updates the flow progress information table 1361 as illustrated in FIG. 28. That is, in the record identified by the job ID "Job101", the flow progress management unit 134A updates the execution status of the operation "ocr" to "DONE" indicating that the corresponding operation has been executed. In this way, the flow progress management unit 134A may manage information indicating that the operation 1201 among the operations defined in the process content 1200 acquired in step S2602 has been executed (i.e., properly executed).

Also, the flow progress management unit 134A stores the OCR-processed data included in the flow progress information as resume data 1362 in association with the job ID in the flow progress information storage unit 136A.

Then, the flow execution unit 131 sends a component acquisition request to the component management unit 132 according to an operation defined in the process content 1200 acquired in step S2602 (step S2616). More specifically, based on the operation 1202 defined after the operation 1201 in the process content 1200 illustrated in FIG. 27, the flow execution unit 131 sends a component acquisition request for acquiring the delivery component 1331 to the component management unit 132.

Upon receiving the component acquisition request for acquiring the delivery component 131, the component management unit 132 generates the delivery component 1331 (step S2617). Then, when the delivery component 1331 is generated, the component management unit 132 returns the generated delivery component 1331 to the flow execution unit 131.

The flow execution unit 131 designates data in a component process execution request and sends the component process execution request to the generated delivery component 1331 (step S2618). Note that in the present example, the data type of the designated data is "LocalFilePath".

The delivery component 1331 sends a type conversion request to the type conversion management unit 141 (step S2619). Note that in the present case, the type conversion request includes data and a designation of the data type "LocalFilePath" as the data type that can be handled by the delivery component 1331.

Upon receiving the type conversion request, the type conversion management unit 141 checks whether the data type of the data included in the received type conversion request matches the data type designated in the received type conversion request (step S2620). In the present case, the data type of the data included in the received type conversion request is "LocalFilePath", and the data type designated in the received type conversion request is also "LocalFilePath". Thus, the type conversion management unit 141 determines that the data type of the data included in the type conversion request and the designated data type match.

Accordingly, the type conversion management unit 141 sends the data included in the type conversion request directly to the delivery component 1331 (step S2621). As described above, in the case where it is determined that the data type of the data included in the type conversion request matches the designated data type (in the process of step S2620), the type conversion management unit 141 does not generate the type conversion 1421 for converting data types.

Upon receiving the data from the type conversion management unit 141, the delivery component 1331 executes a data delivery process (step S2622). Then, the delivery component 1331 sends a process result of the executed data delivery process to the flow execution unit 131.

More specifically, the delivery component 1331 sends a process execution request to the file process unit 170₁ of the storage service A cooperation unit 160₁ to execute a delivery process of delivering data to a folder with the folder ID entered in the storage destination folder ID input field G403 of the app screen G400 illustrated in FIG. 25 using the API "service-a/process/folder" indicated in FIG. 5A.

Note that as described above, in the present embodiment, it is assumed that an error occurs in the process of step S2622. That is, it is assumed that the delivery component 1331 fails to deliver the electronic file to the storage service A. In such a case, the flow execution unit 131 receives information indicating an error code or the like of the error that has occurred in the delivery component 1331 (error information) as a process result.

In the following descriptions, it is assumed that the flow execution unit 131 receives error information indicating that an error has occurred due to the absence of a folder with the designated folder ID that has been entered in the storage destination folder ID input field G403 of the app screen G400 illustrated in FIG. 25 (e.g., "invalid_folder_id").

In such case, the flow execution unit 131 designates the job ID generated in step S2603 in a resume process content generation request, and sends the resume process content generation request to the sub flow generation unit 135A to have process content for resuming the process of the component that has failed due to an error or the like (hereinafter referred to as "resume process content") (step S2623). In turn, the sub flow generation unit 135A refers to the flow progress information table 1361 to generate resume process content 4000 as illustrated in FIG. 29, for example (step S2624). Note, however, that in a case where the process content 1200 acquired in step S2602 defines information indicating that such resume process content should not be generated (e.g., "createsubFlow=false"), the flow execution unit 131 may refrain from executing the process of step S2623.

In the process content 4000 illustrated in FIG. 29, "isSubFlow" is defined as "true" indicating that the relevant process content corresponds to resume process content. Also, "flowDetails" of the resume process content 4000 illustrated in FIG. 29 defines operations 4100 and 4200 of the resume process content 4000.

The operation 4100 defines a process for acquiring the resume data 1362 of the job with the job ID "Job101" that has failed due to an error. Also, the operation 4200 defines a process for executing the delivery component 1331 that has failed due to an error. As can be appreciated, the resume process content 4000 defines a process for acquiring the resume data 1362 of the job that has failed due to an error or the like, and a remainder of the series of processes defined after the process that has failed in the process content of the job. In other words, the resume process content 4000 defines a process of acquiring the resume data 1362 corresponding to data resulting from one or more processes that have been properly executed before the occurrence of an error or the like and a process corresponding to an operation for which the execution status is set as "NOT DONE" in the job that has failed due to an error or the like.

Figure 30A:
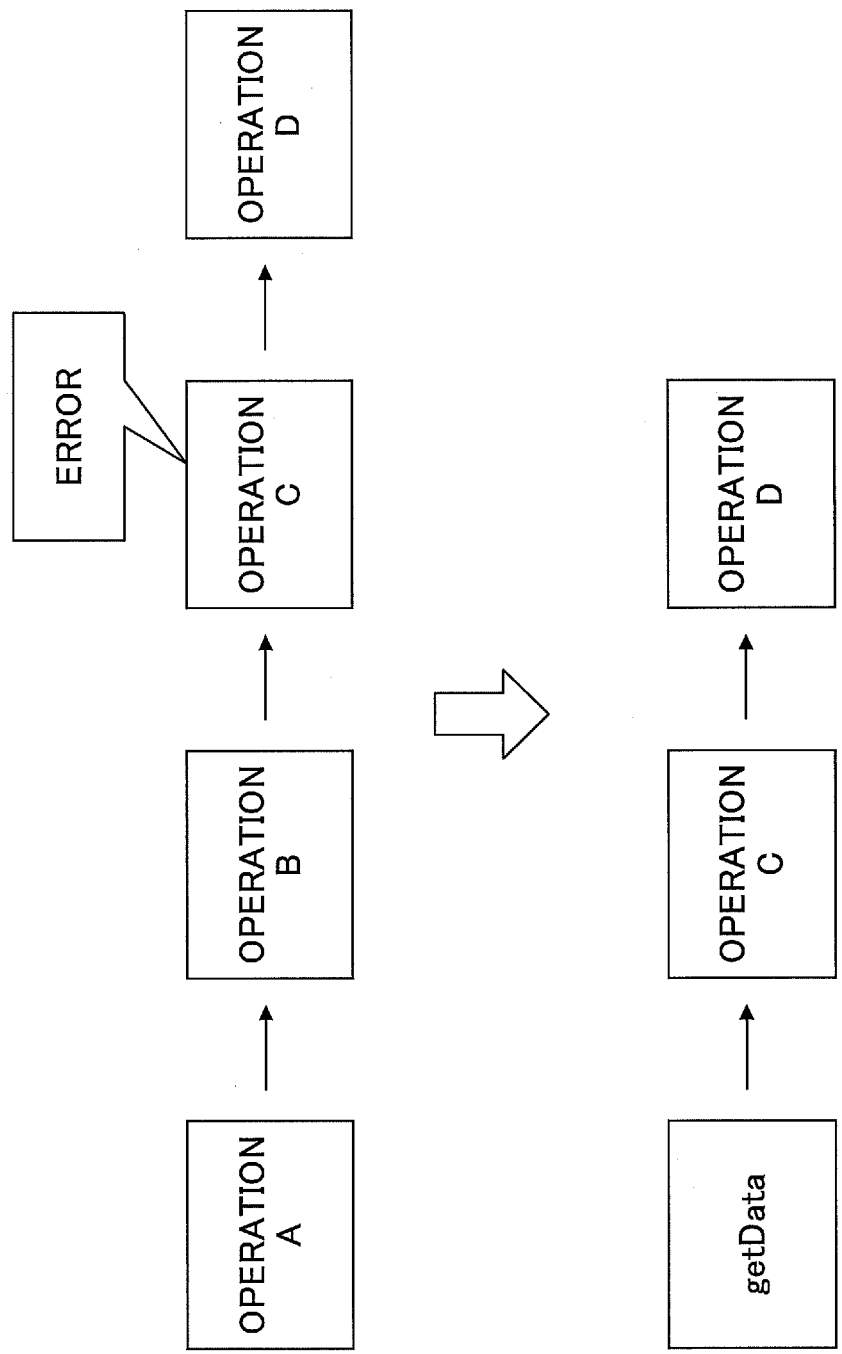
FIGS. 30A and 30B illustrate examples of resume process content generated by a sub flow generation unit.
Figure 30B:
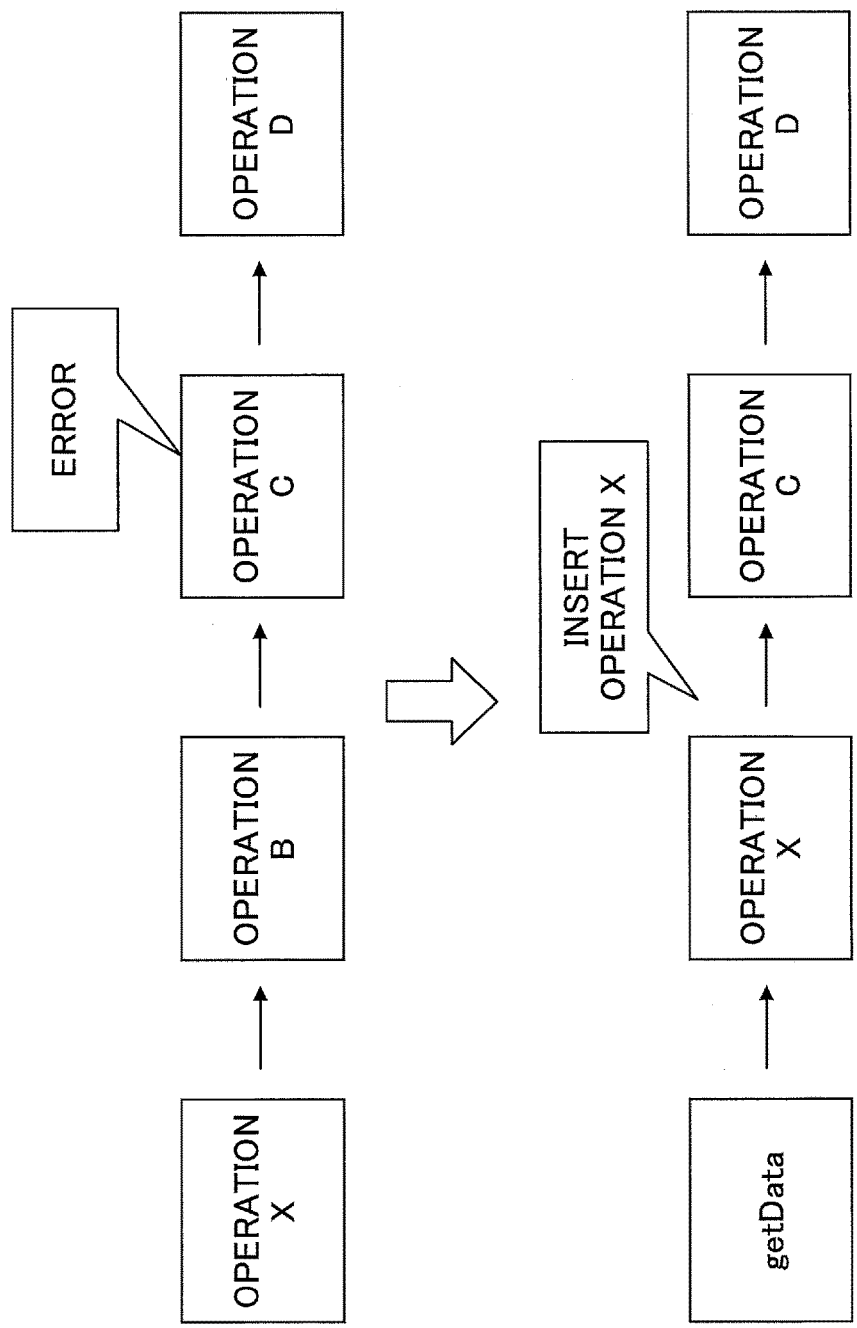

More generally, as illustrated in FIG. 30A, for example, with respect to a job with process content defining operations A-D in the recited order, if an error occurs in operation C, the corresponding resume process content may be generated as follows. That is, the resume process content defines a process for acquiring the resume data 1362 (getData) followed by the operations C and D. In this way, when re-executing the job that has failed due to an error or the like, the operations C and D may be executed without re-executing the operations A and B that have already been properly executed.

Note that when a specific relationship exists between two or more of operations, the sub flow generation unit 135A may generate resume process content in consideration of such specific relationship. For example, in a case where a specific relationship exists between operation X and operation D such that operation X has to be defined before operation D, the corresponding resume process content may be generated as follows. That is, as illustrated in FIG. 13B, if an error occurs in operation C, the resume process content defines operation X before operation C. Note that a specific relationship between operation X and operation D may exist, for example, in a case where operation D corresponds to a delivery process for delivering data to a storage service that requires the execution of an authentication process beforehand, and the operation X corresponds to the authentication process for accessing the storage service.

After generating the resume process content 4000, the sub flow generation unit 135A sends a resume process content registration request to the app management unit 120 to have the generated resume process content 4000 registered (step S2625). In turn, the app management unit 120 stores the generated resume process content 4000 in the app information storage unit 190 in association with the app ID "app001" of the job that has failed due to an error or the like. Also, at this time, the app management unit 120 generates a flow ID for uniquely identifying the resume process content 4000.

Then, the app management unit 120 sends the generated flow ID to flow execution unit 131. Note that in the present example, it is assumed that a flow ID "subflow1" has been generated as the unique flow ID for identifying the resume process content 4000.

Figure 31:
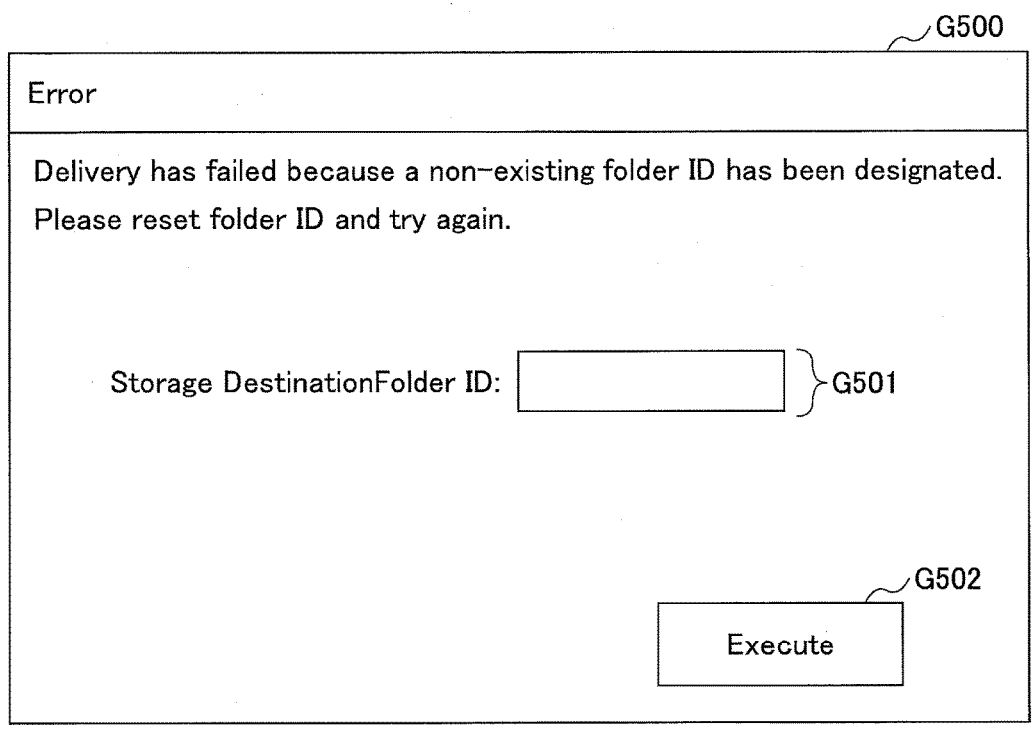
FIG. 31 illustrates another exemplary error screen.

Upon receiving the flow ID "subflow1" of the resume process content 4000, the flow execution unit 131 sends the received flow ID "subflow1" and error information to the browser 210 of the image forming apparatus 20 (step S2626). At this time, the flow execution unit 131 may acquire screen information for displaying an error screen as illustrated in FIG. 31, for example, from the app information storage unit 190 via the app management unit 120, and send the error screen G500 based on the acquired screen information to the browser 210. In the following, FIG. 32 is used to illustrate an example in which a resume process for resuming a delivery execution process is executed according to an instruction from a user that is input via the error screen G500 as illustrated in FIG. 31.

<<Resume Process for Delivery Execution Process>>

Figure 32:
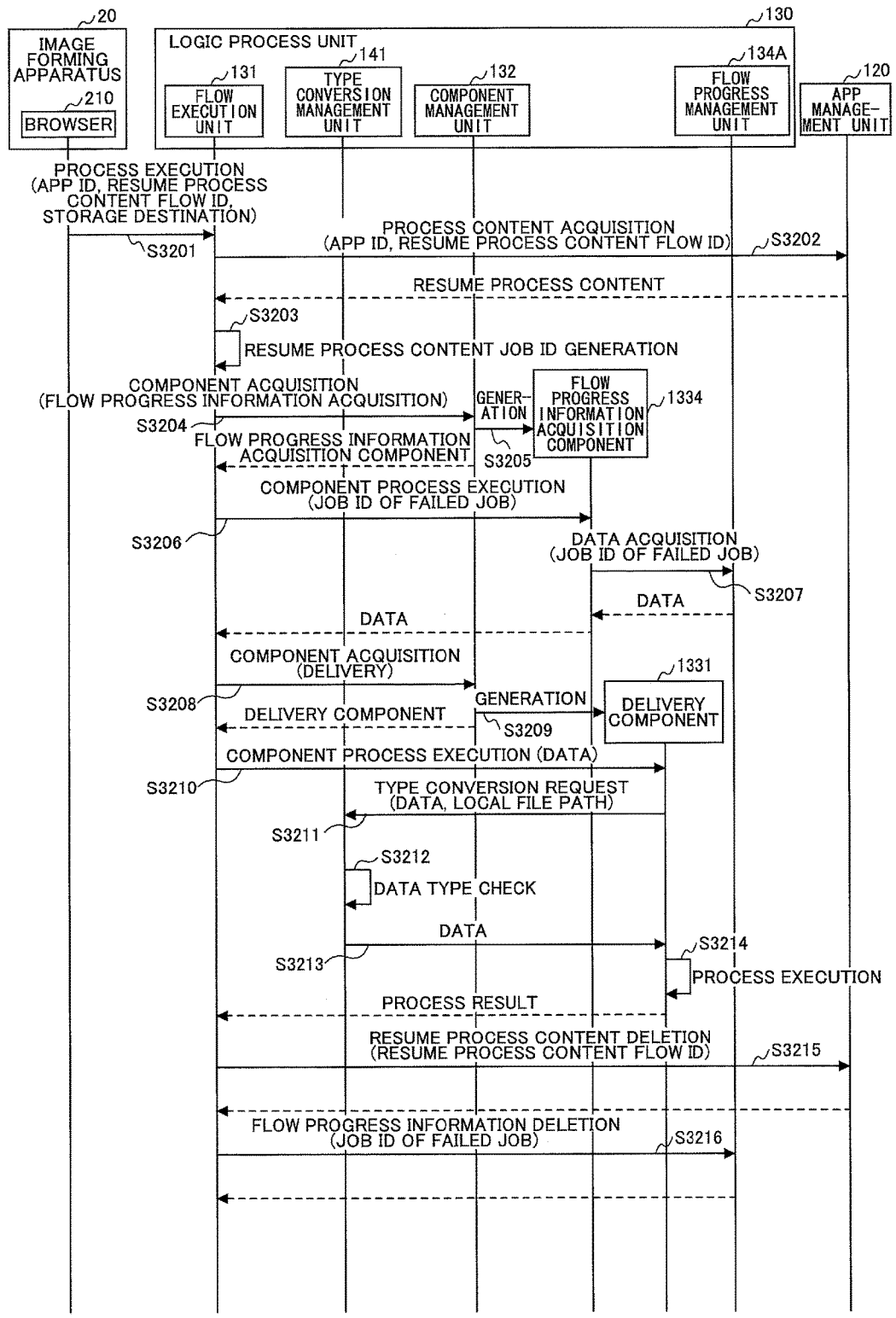
FIG. 32 is a sequence chart illustrating an exemplary resume process for a delivery execution process according to the fourth embodiment.

FIG. 32 is a sequence chart illustrating an exemplary resume process for a delivery execution process according to the fourth embodiment.

In the error screen G500 shown in FIG. 31, the user enters a folder ID of a storage destination folder of the storage service A in a storage destination folder ID input field G501 and presses an execution button G502. In turn, the browser 210 of the image forming apparatus 20 sends a process execution request to flow execution unit 131 for delivering an electronic file to the storage destination folder with the folder ID that has been entered in the storage destination folder ID input field G501 (step S3201).

Note that in the present example, the process execution request may include the app ID "app001", the flow ID "subflow1" of the resume process content 4000, and the folder ID of the storage destination folder entered in the storage destination folder ID input field G501 of the error screen G500 illustrated in FIG. 31, for example.

Upon receiving the process execution request, the flow execution unit 131 acquires the resume process content 4000 with the flow ID "subflow1" from the app information 1000$_1$ with the app ID "app001" included in the process execution request via the app management unit 120 (step S3202). That is, the flow execution unit 131 acquires the resume process content 4000 as illustrated in FIG. 29.

Then, based on the resume process content 4000 acquired in step S3202, the flow execution unit 131 generates a job ID for uniquely identifying the job to be executed (step S3203). In the present example, it is assumed that a job ID "Job103" has been generated.

Then, the flow execution unit 131 sends a component acquisition request to the component management unit 132 according to an operation defined in the acquired resume process content 4000 (step S3204). More specifically, based on the operation 4100 defined in the resume process content 4000 illustrated in FIG. 29, the flow execution unit 131 sends a component acquisition request to the component management unit 132 for acquiring the flow progress information acquisition component 1334.

Upon receiving the component acquisition request for the flow progress information acquisition component 1334, the component management unit 132 generates the flow progress information acquisition component 1334 (step S3205). Note that the flow progress information acquisition component 1334 can be generated using an API for generating a component defined in the component common I/F 1330. Then, when the flow progress information acquisition component 1334 is generated, the component management unit 132 returns the generated flow progress information acquisition component 1334 to the flow execution unit 131.

The flow execution unit 131 designates the job ID "Job101" of the job that has failed due to an error in a component process execution request and sends the component process execution request to the generated flow progress information acquisition component 1334 (step S3206).

In turn, the flow progress information acquisition component 1334 acquires the resume data 1362 stored in the flow progress information storage unit 136A in association with the designated job ID "Job101" via the flow progress management unit 134A, (step S3207). Then, the flow progress information acquisition component 1334 sends the acquired resume data 1362 to the flow execution unit 131. Note that the resume data 1362 acquired in the present example corresponds to the OCR-processed data generated in step S2613 of FIG. 26. Note that in the following descriptions of FIG. 32, the acquired resume data 1362 is simply referred to as "data".

Then, the flow execution unit 131 sends a component acquisition request to the component management unit 132 according to an operation defined in the resume process content 4000 acquired in step S3202 (step S3208). More specifically, based on the operation 4200 defined after the operation 4100 in the resume process content 4000 illustrated in FIG. 29, the flow execution unit 131 sends a component acquisition request for acquiring the delivery component 1331 to the component management unit 132.

Upon receiving the component acquisition request for the delivery component 1331, the component management unit 132 generates the delivery component 1331 (step S3209). Then, when the delivery component 1331 is generated, the component management unit 132 returns the delivery component 1331 to the flow execution unit 131.

Note that in step S3209, if the delivery component 1331 has already been generated, the component management unit 132 may not generate the delivery component 1331.

Then, the flow execution unit 131 designates data in a component process execution request and sends the component process execution request to the generated delivery component 1331 (step S3210). Note that in the present example, the data type of the designated data is "LocalFilePath".

Then, the delivery component 1331 sends a type conversion request to the type conversion management unit 141

(step S3211). Note that the relevant type conversion request includes data and a designation of the data type "LocalFilePath" indicating the data type that can be handled by the delivery component 1331.

The type conversion management unit 141 checks whether the data type of the data that is included in the received type conversion request and the data type designated in the received type conversion request match (step S3212). In the present example, the data type of the data included in the received type conversion request is "LocalFilePath" and the data type designated in the received type conversion request is also "LocalFilePath", and therefore, it is determined that the data type of the data and the designated data type match. Accordingly, the type conversion management unit 141 sends the data included in the type conversion request directly to the delivery component 1331 (step S3213).

Upon receiving the data from the type conversion management unit 141, the delivery component 1331 executes a process of delivering the data (step S3214). Then, the delivery component 1331 sends a process result of delivering the data to the flow execution unit 131. In the present example, it is assumed that the delivery component 1331 sends a process result indicating that the process of delivering the data has been properly executed to the flow execution unit 131.

More specifically, the delivery component 1331 requests the file process unit 170₁ of the storage service A cooperation unit 160₁ to execute a delivery process of delivering the data to a storage destination folder identified by the folder ID entered in the storage destination folder ID input field G501 of the error screen G500 illustrated in FIG. 31 using the API "service-a/process/folder" indicated in FIG. 5A.

The flow execution unit 131 sends a resume process content deletion request to the app management unit 120, designating the flow ID "subflow1" of the resume process content 4000 (step S3215). Upon receiving the deletion request from the flow execution unit 131, the app management unit 120 deletes the resume process content 4000 for the flow with the flow ID "subflow1" that is stored in association with the application ID "app001" in the app information storage unit 190.

Then, the flow execution unit 131 sends a flow progress information deletion request to the flow progress management unit 134A, designating the job ID "Job101" and requesting for the deletion of the record and the resume data 1362 identified by the job ID "Job101" from the flow progress information table 1361 (step S3216). Upon receiving the flow progress information deletion request from the flow execution unit 131, the flow progress management unit 134A deletes the record identified by the job ID "Job101" from the flow progress information table 1361. Also, the flow progress management unit 134A deletes the resume data 1362 that is stored in association with the job ID "Job101" in the flow progress information storage unit 136A. In this way, the resume process for the delivery execution process may be completed.

Fifth Embodiment

In the following, a fifth embodiment of the present invention is described. According to the fifth embodiment, when an error or the like occurs while executing a job based on process content, the service providing system 10 determines whether automatic recovery from the error or the like is possible. If the service providing system 10 according to the fifth embodiment determines that automatic recovery from the error is possible, it automatically executes a job based on resume process content for the job that has failed.

Also, in the service providing system 10 according to the fifth embodiment, error information of errors that have occurred in each operation defined in process content is managed, and if an error resulting from incorrectly entering information occurs frequently, for example, a warning may be made to the user. In the following descriptions of the fifth embodiment, features and elements that have substantially the same function or that perform substantially the same processes as those of the fourth embodiment are given the same reference numerals and descriptions thereof may be omitted.

<Software Configuration>

Figure 33:
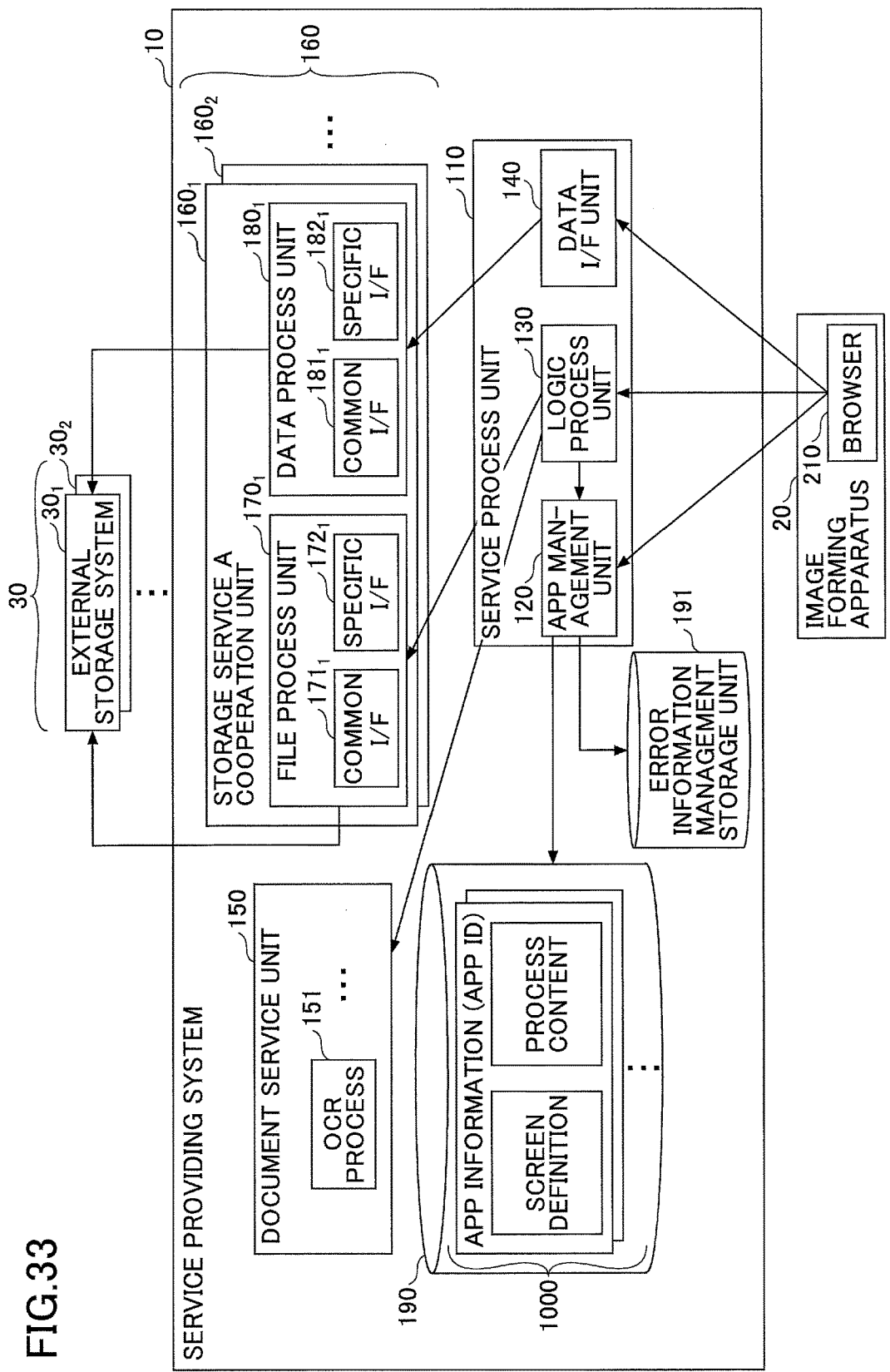
FIG. 33 is a block diagram illustrating an exemplary functional configuration of the information processing system according to a fifth embodiment of the present invention.

First, the functional configuration of the information processing system 1 according to the fifth embodiment is described with reference to FIG. 33. FIG. 33 is a block diagram illustrating an exemplary functional configuration of the information processing system 1 according to the fifth embodiment. The service providing system 10 according to the fifth embodiment includes an error information management storage unit 191.

The error information management storage unit 191 stores an error information management table 5000 as illustrated in FIG. 34. The error information management table 5000 illustrated in FIG. 34 manages, with respect to each app ID and with respect to each process content included in the app information 1000 identified by the app ID, the operation and component that have experienced an error, error information on the specific error that has occurred, and an error count of the error.

For example, referring to FIG. 34, it can be appreciated that with respect to the operation "uploadFile" (delivery component) defined in the process content 1200 with the flow ID "flow2" included in the app information 1000₁ with the app ID "app001", the error "invalid_folder_id" has occurred a total of 50 times.

Figure 35:
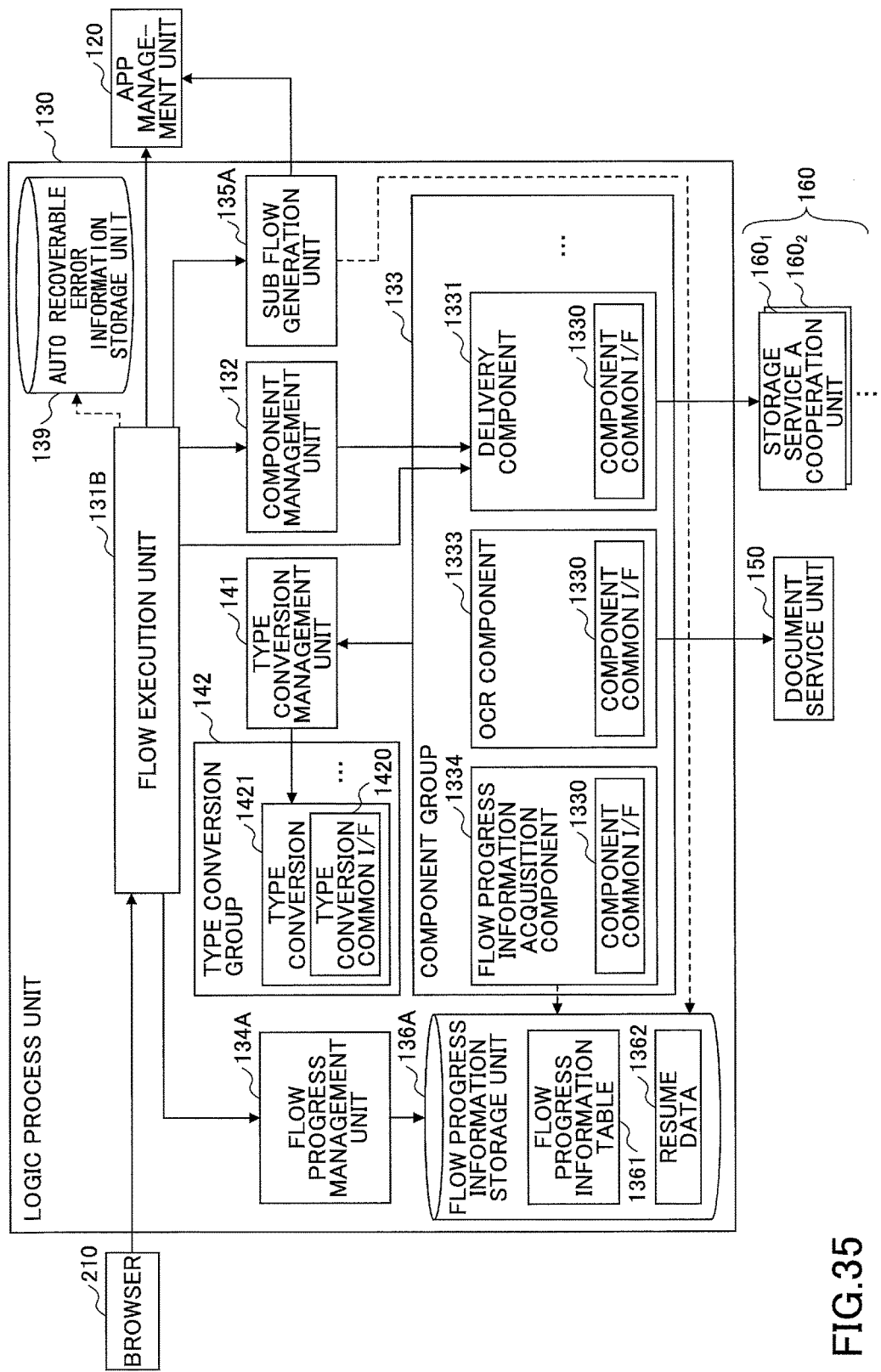
FIG. 35 is a block diagram illustrating an exemplary functional configuration of the logic process unit according to the fifth embodiment.

In the following, the logic process unit 130 according to the fifth embodiment is described with reference to FIG. 35. FIG. 35 is a block diagram illustrating an exemplary functional configuration of the logic process unit 130 according to the fifth embodiment. The logic process unit 130 according to the fifth embodiment includes a flow execution unit 131B and an auto recoverable error information storage unit 139.

Upon receiving error information as a process result from a component, the flow execution unit 131B refers to an auto recoverable error information table 6000 to determine whether the received error information corresponds to automatic recoverable error information. When the flow execution unit 131B determines that the received error information corresponds to auto recoverable error information, the flow execution unit 130 executes a process according to corresponding resume process content.

The auto recoverable error information storage unit 139 stores the auto recoverable error information table 6000 as illustrated in FIG. 36. The auto recoverable error information table 6000 illustrated in FIG. 36 defines error information of errors that can be automatically recovered by having the flow execution unit 131B automatically execute a process according to corresponding resume process content. In the present example, error information relating to errors resulting from temporary communication failure due to network congestion or the like (e.g., error information "network error" and "network timeout") are defined as auto recoverable error information. Also, error information relating to an error resulting from the temporary unavailability of the external storage system 30 (e.g., error information "service unavailable") is defined as auto recoverable error information. When an error occurs during execution of a process due to such temporary communication failure or temporary unavailability of a service, the process may oftentimes be properly executed upon re-executing the process.

<Process Details>

Figure 37:
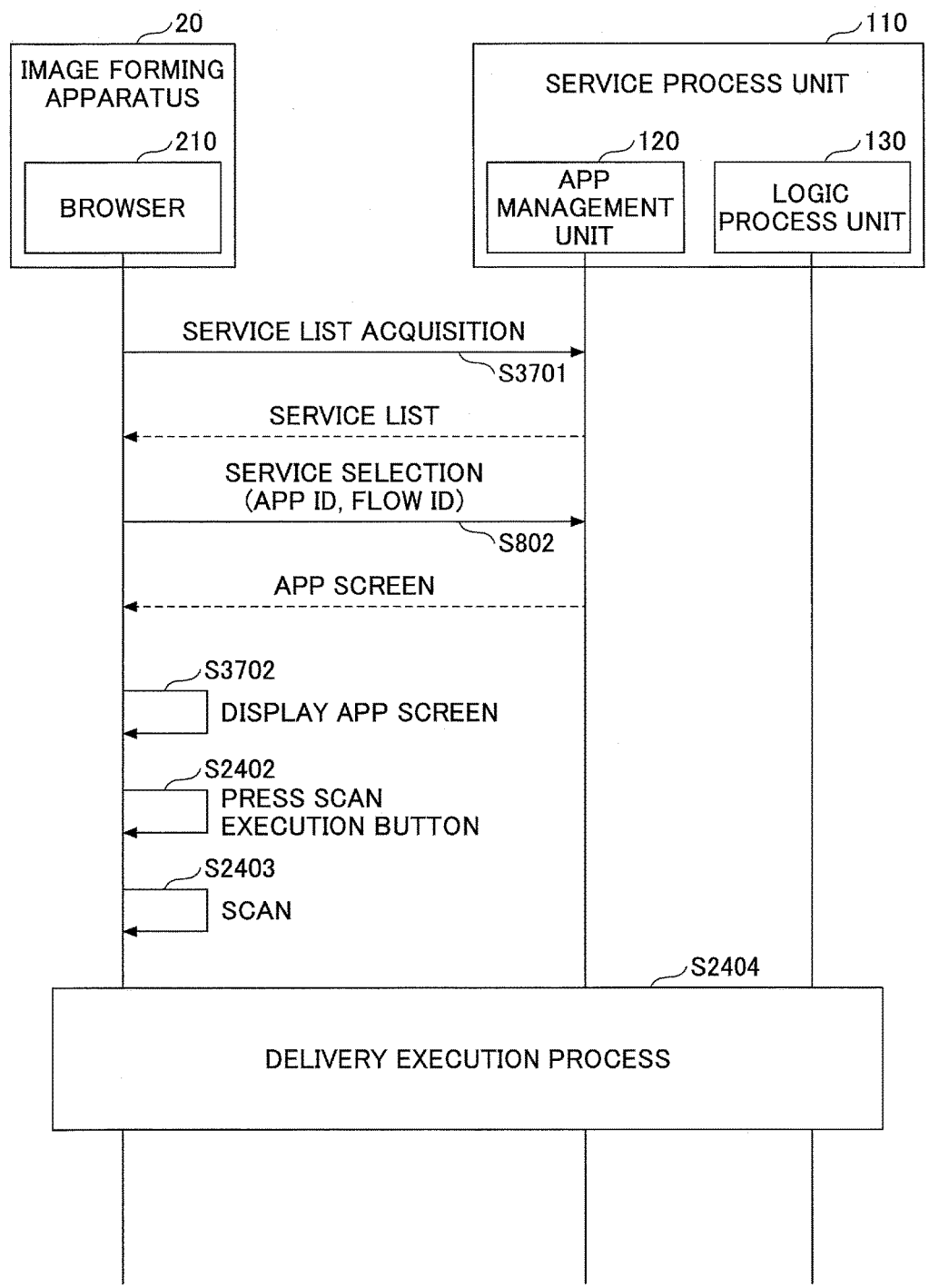
FIG. 37 is a sequence chart illustrating an exemplary overall process of the scan delivery service according to the fifth embodiment.

In the following, processes implemented by the information processing system 1 according to the present embodiment are described in detail with reference to FIG. 37.

<<Overall Process of Scan Delivery Service>>

First, the user of the image forming apparatus 20 uses the browser 210 to perform an operation for acquiring a list of services provided by the service providing system 10. In turn, the browser 210 of the image forming apparatus 20 sends a service list acquisition request for acquiring the list of services to the service process unit 110 of the service providing system 10 (step S3701). Then, the app management unit 120 of the service process unit 110 receives the service list acquisition request and sends a list of services provided by the service providing system 10 to the image forming apparatus 20. In turn, the browser 210 displays the acquired list of services provided by the service providing system 10 at the operation panel 22 of the image forming apparatus 20.

In the present embodiment, the list of services includes the service names of the services provided by the service providing system 10, the app IDs of the app information 1000 for implementing the services, and the flow IDs of the process contents included in the app information 1000. The list of services also includes error information and an error count for each app ID and flow ID. That is, in the present embodiment, error information of errors that have occurred for each app ID and flow ID, and the error count are transmitted to the browser 210.

Figure 38:
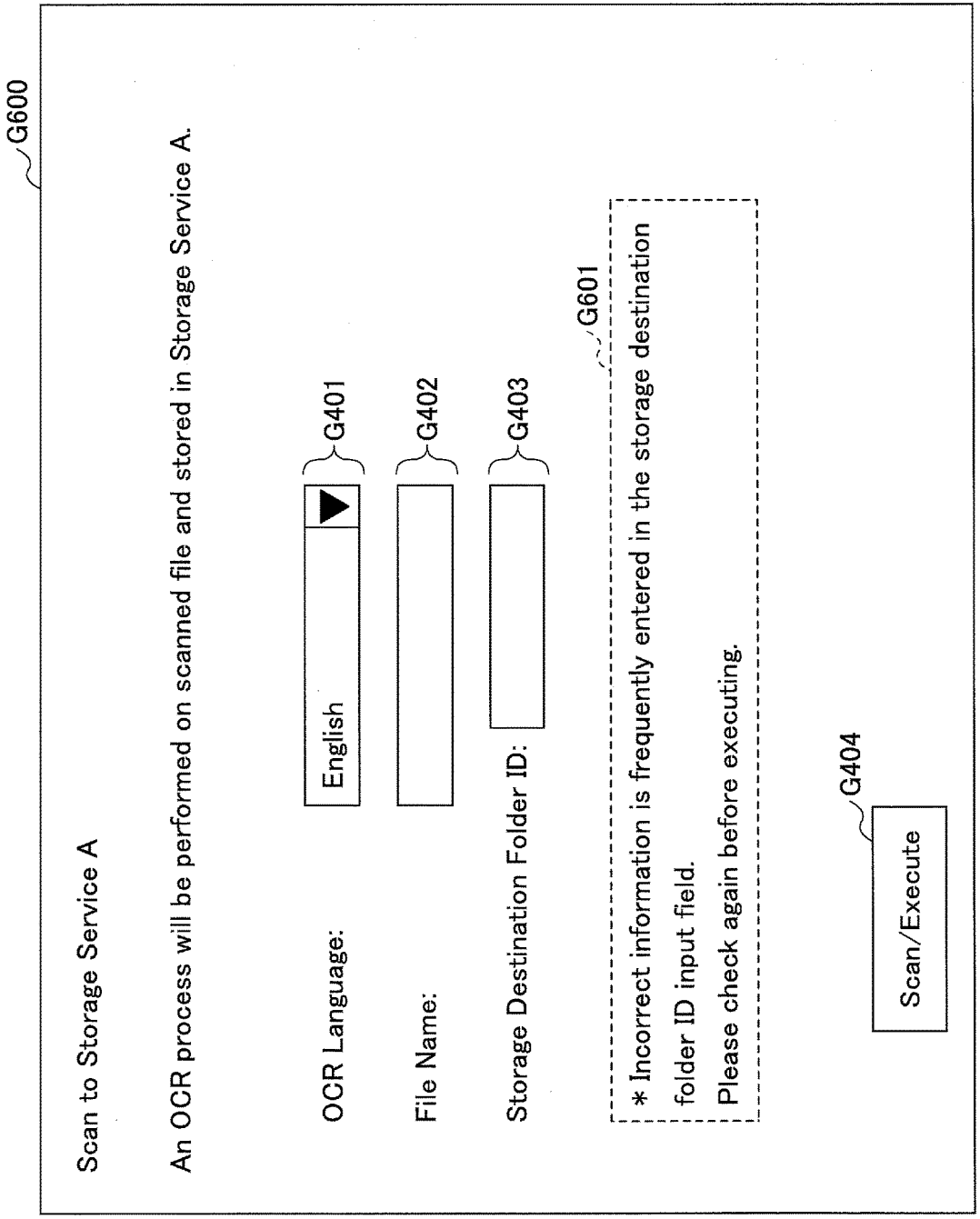
FIG. 38 illustrates another exemplary application screen for using the scan delivery service.

Upon receiving an app screen from the app management unit 120, the browser 210 may display an app screen G600 as illustrated in FIG. 38, for example, at the operation panel 22 (step S3702). FIG. 38 illustrates the app screen G600 for using a scan delivery service according to the present embodiment. Based on the received error information and the error count for each app ID and flow ID, for example, the image forming apparatus 20 may identify an error with an error count exceeding a predetermined number and display a message alerting the user that errors frequently occur in a relevant operation.

In the example illustrated in FIG. 38, a message G601 is displayed in order to alert the user of an error relating to the error information "invalid_folder_id" caused by incorrectly entering a folder ID in the storage destination folder ID input field G403. By displaying a message alerting the user of the frequent occurrence of a particular error in the app screen G600 displayed by the browser 210 of the image forming apparatus 20 as described above, for example, the occurrence of the error may be reduced.

Note that in the above example, the message G601 for alerting the user of an error is generated at the image forming apparatus 20. However, the present invention is not limited thereto, and a similar message or the like may be generated at the service process unit 110 of the service providing system 10, for example.

<<Delivery Execution Process>>

Figure 39:
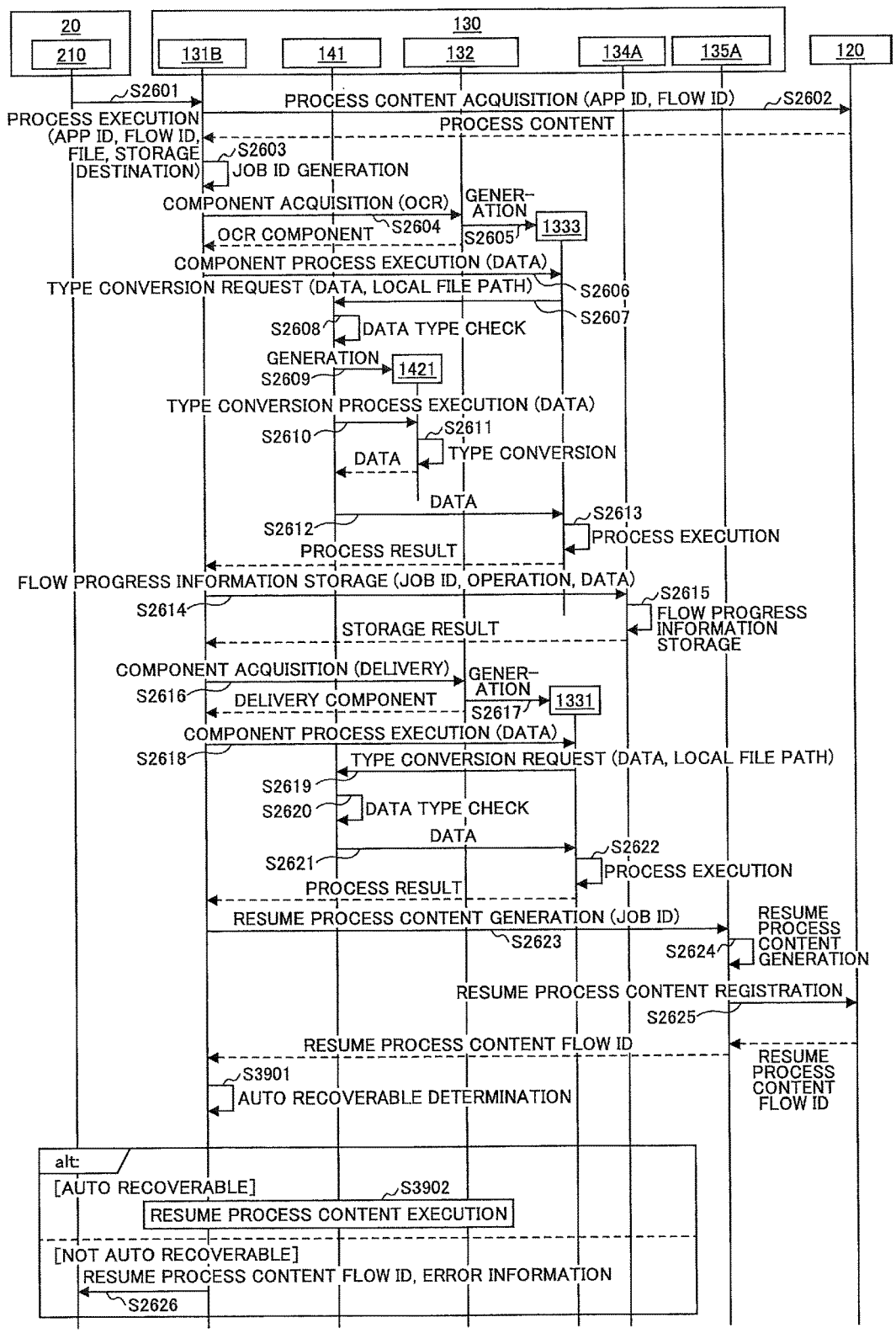
FIG. 39 is a sequence chart illustrating an exemplary delivery execution process according to the fifth embodiment.

In the following, the delivery execution process according to the fifth embodiment is described with reference to FIG. 39. FIG. 39 is a sequence chart illustrating exemplary process steps of the delivery execution process according to the fifth embodiment. Note that in the delivery execution process illustrated in FIG. 39 described below, as in the above-described delivery execution process according to the fourth embodiment, it is assumed that a process of delivering (uploading) an electronic file to the storage service A (upload) ends in failure (due to an error occurrence).

When an error occurs in the process of delivering an electronic file that is executed by the delivery component 1331, the flow execution unit 131B refers to the auto recoverable error information table 6000 to determine whether the error information received from the delivery component 1331 corresponds to auto recoverable error information (step S3901). That is, the flow execution unit 131B determines whether the error information received from the delivery component 1331 is stored in the auto recoverable error information table 6000.

If it is determined that the received error information is stored in the auto recoverable error information table 6000, the flow execution unit 131B determined that the received error information corresponds to auto recoverable error information. On the other hand, if it is determined that the received error information is not stored in the auto recoverable error information table 6000, the flow execution unit 131B determined that the received error information does not correspond to auto recoverable error information.

When the flow execution unit 131B determines that the received error information corresponds to auto recoverable error information, the flow execution unit 130 executes a job based on the resume process content that has been generated (step S3902). That is, the flow execution unit 131B executes the process steps S3202-S3216 of FIG. 32.

SUMMARY

As described above, the service providing system 10 according to the first embodiment manages information relating to whether components that are executed according to operations defined in process content of a series of processes have been properly executed. In this way, when the series of processes is abnormally terminated due to an error or the like that has occurred while executing a process of a component according to an operation of the operations defined in the process content, process results of processes that have been executed before the error occurrence may be undone and data may be restored to its original state, for example.

Also, in the service providing system 10 according to the second embodiment, when an error indicating that an external service is temporarily unavailable occurs while executing a process according to a restoration operation defined in restoration process content, the process according to the restoration operation defined in the restoration process content is re-executed after a predetermined time period elapses. Further, in the service providing system 10 according to the second embodiment, when an error that does not have to be addressed occurs while executing a process according to a restoration operation defined in the restoration process content, a subsequent process is executed according to a restoration operation defined after the relevant restoration operation. That is, according to an aspect of the second embodiment, operations such as continuing a restoration process, re-executing the restoration process after a predetermined time period elapses, or abnormal termination may be dynamically implemented according to the error information of the error that has occurred in the restoration process.

Also, the service providing system 10 according to the third embodiment executes a process according to a restoration operation selected by a user from among the restoration operations defined in restoration process content. That is, according to an aspect of the third embodiment, the user can select one or more operations that are to be subject to a restoration process. Such an aspect of the present embodiment may be convenient for the user that wishes to leave a folder that has been newly created in executing a job even when the execution of the job has failed due to an error, for example.

Also, the service providing system 10 according to the fourth embodiment manages the data resulting from one or more processes that have been properly executed by components according to the operations defined in the process content. Thus, when a process of a component is abnormally terminated due to an error or the like that has occurred in executing the process of the component according to an operation defined in the process content, the process of the component that has been abnormally terminated may be resumed without re-executing the one or more processes of the components that have been properly executed.

Further, the service providing system 10 according to the fifth embodiment enables a process of a component that has been abnormally terminated to be automatically resumed depending on the error information of the error that has occurred. Thus, even when an error or the like occurs while executing a process of a component according to an operation defined in process content of a series of processes, the user may be able to complete the process without paying heed to the error that has occurred in the process, for example.

Although the present invention has been described above with reference to certain illustrative embodiments, the present invention is not limited to these embodiments, and numerous variations and modifications may be made without departing from the scope of the present invention.

APPENDIX

In the following, various aspects of the present invention are described.

According to one aspect of the present invention, an information processing system is provided that includes at least one information processing apparatus. The information processing system includes a first storage unit configured to store, with respect to each application for executing a first process corresponding to a series of processes using electronic data, application identification information for identifying the application and information relating to the first process in association with each other; a receiving unit configured to receive from one device among one or more devices that are connectable to the information processing system, a request including the application identification information and information relating to electronic data designated at the one device; a process execution unit configured to execute the first process based on the information relating to the first process stored in the first storage unit in association with the application identification information that is included in the request received by the receiving unit, the process execution unit executing the first process with respect to electronic data based on the information relating to the electronic data that is included in the request; and a process generation unit configured to generate information relating to a second process in a case where an error has occurred in the first process executed by the process execution unit, the second process corresponding to a series of processes for undoing a process result of the first process executed by the process execution unit until the error has occurred to restore a process state to a previous state before the execution of the first process. The process execution unit executes the second process based on the information relating to the second process generated by the process generation unit in the case where the error has occurred in the first process.

According to one preferred embodiment, the process execution unit includes a plurality of components each configured to execute a predetermined process with respect to electronic data; and the process execution unit executes the first process by combining at least one of a first component of the plurality of components.

According to a further preferred embodiment, the information processing system includes a second storage unit configured to store process content of the first component and process content of a second component in association with each other, the second component being configured to execute a restoration process of undoing a process result of a process executed by the first component to restore the process state to a previous state before the execution of the process of the first component.

According to another aspect of the present invention, an information processing apparatus is provided that includes a first storage unit configured to store, with respect to each application for executing a first process corresponding to a series of processes using electronic data, application identification information for identifying the application and information relating to the first process in association with each other; a receiving unit configured to receive from one device among one or more devices that are connectable to the information processing system, a request including the application identification information and information relating to electronic data designated at the one device; a process execution unit configured to execute the first process based on the information relating to the first process stored in the first storage unit in association with the application identification information that is included in the request received by the receiving unit, the process execution unit executing the first process with respect to electronic data based on the information relating to the electronic data that is included in the request; and a process generation unit configured to generate information relating to a second process in a case where an error has occurred in the first process executed by the process execution unit, the second process corresponding to a series of processes for undoing a process result of the first process executed by the process execution unit until the error has occurred to restore a process state to a previous state before the execution of the first process. The process execution unit executes the second process based on the information relating to the second process generated by the process generation unit in the case where the error has occurred in the first process.

According to another aspect of the present invention, an information processing method is provided that is implemented by an information processing system including a first storage unit configured to store, with respect to each application for executing a first process corresponding to a series of processes using electronic data, application identification information for identifying the application and information relating to the first process in association with each other. The information processing method includes a receiving step of receiving from one device among one or more devices that are connectable to the information processing system, a request including the application identification information and information relating to electronic data designated at the one device; a process execution step of executing the first process based on the information relating to the first process stored in the first storage unit in association with the application identification information that is included in the request received in the receiving step, the process execution step executing the first process with respect to electronic data based on the information relating to the electronic data that is included in the request; and a process generation step of generating information relating to a second process in a case where an error has occurred in the first process executed in the process execution step, the second process corresponding to a series of processes for undoing a process result of the first process executed in the process execution step until the error has occurred to restore a process state to a previous state before the execution of the first process. The process execution step includes executing the second process based on the information relating to the second process generated in the process generation step in the case where the error has occurred in the first process.

According to another aspect of the present invention, an information processing system is provided that includes at least one information processing apparatus. The information processing system includes a first storage unit configured to store, with respect to each application for executing a first process corresponding to a series of processes using electronic data, application identification information for identifying the application and information relating to the first process in association with each other; a receiving unit configured to receive from one device among one or more devices that are connectable to the information processing system, a request including the application identification information and information relating to electronic data designated at the one device; a process execution unit configured to execute the first process based on the information relating to the first process stored in the first storage unit in association with the application identification information that is included in the request received by the receiving unit, the process execution unit executing the first process with respect to first electronic data based on the information relating to the electronic data that is included in the request; and a process generation unit configured to generate information relating to a second process in a case where an error has occurred in an operation process included in the first process executed by the process execution unit, the second process corresponding to a series of processes coming after the operation process of the first process in which the error has occurred. The process execution unit executes the second process based on the information relating to the second process generated by the process generation unit in the case where the error has occurred in the operation process included in the first process.

According to one preferred embodiment, the process execution unit stores in a second storage unit, second electronic data indicating a process result of the first process executed using the first electronic data until the error has occurred. The process execution unit executes the second process based on the information relating to the second process generated by the process generation unit, using the second electronic data stored in the second storage unit, in the case where the error has occurred in the operation process included in the first process.

According to a further preferred embodiment, the process execution unit includes a plurality of components each configured to execute a predetermined process with respect to electronic data, and the process execution unit executes the first process using the first electronic data by combining one or more components of the plurality of components.

According to a further preferred embodiment, the plurality of components includes a first component for acquiring the second electronic data from the second storage unit, and the process execution unit executes the second process using the second electronic data by combining the first component and at least one second component that is included in the one or more components of the plurality of components.

According to another aspect of the present invention, an information processing apparatus is provided that includes a first storage unit configured to store, with respect to each application for executing a first process corresponding to a series of processes using electronic data, application identification information for identifying the application and information relating to the first process in association with each other; a receiving unit configured to receive from one device among one or more devices that are connectable to the information processing system, a request including the application identification information and information relating to electronic data designated at the one device; a process execution unit configured to execute the first process based on the information relating to the first process stored in the first storage unit in association with the application identification information that is included in the request received by the receiving unit, the process execution unit executing the first process with respect to first electronic data based on the information relating to the electronic data that is included in the request; and a process generation unit configured to generate information relating to a second process in a case where an error has occurred in an operation process included in the first process executed by the process execution unit, the second process corresponding to a series of processes coming after the operation process of the first process in which the error has occurred. The process execution unit executes the second process based on the information relating to the second process generated by the process generation unit in the case where the error has occurred in the operation process included in the first process.

According to another aspect of the present invention, an information processing method is provided that is implemented by an information processing system including a first storage unit configured to store, with respect to each application for executing a first process corresponding to a series of processes using electronic data, application identification information for identifying the application and information relating to the first process in association with each other. The information processing method includes a receiving step of receiving from one device among one or more devices that are connectable to the information processing system, a request including the application identification information and information relating to electronic data designated at the one device; a process execution step of executing the first process based on the information relating to the first process stored in the first storage unit in association with the application identification information that is included in the request received in the receiving step, the process execution step executing the first process with respect to first electronic data based on the information relating to the electronic data that is included in the request; and a process generation step of generating information relating to a second process in a case where an error has occurred in an operation process included in the first process executed in the process execution step, the second process corresponding to a series of processes coming after the operation process of the first process in which the error has occurred. The process execution step includes executing the second process based on the information relating to the second process generated in the process generation step in the case where the error has occurred in the operation process included in the first process.

The present application is based on and claims the benefit of priority of Japanese Patent Application No. 2015-046784 filed on Mar. 10, 2015, Japanese Patent Application No. 2015-046785 filed on Mar. 10, 2015, and Japanese Patent Application No. 2016-002380 filed on Jan. 8, 2016, the entire contents of which are incorporated by reference.

What is claimed is:

1. An information processing system including at least one information processing apparatus, the information processing system comprising:
  a memory that stores a program; and
  a processor that executes the stored program, the execution of the program causing the processor to implement functions of
    a first storage unit configured to store, with respect to an application for executing a first process corresponding to a series of processes using electronic data, application identification information that identifies the application in association with information relating to the first process;
    a receiving unit configured to receive a request from a device connected to the information processing system, the request including the application identification information and information relating to electronic data generated using the device;
    a process execution unit configured to execute the first process based on the information relating to the first process stored in the first storage unit in association with the application identification information that is included in the request received by the receiving unit, the process execution unit executing the first process with respect to generated electronic data based on the information relating to the generated electronic data that is included in the request; and
    a process generation unit configured to generate information relating to a second process when an error has occurred during execution of the first process executed by the process execution unit, the second process corresponding to a series of rollback processes for rolling back a processing result of the first process executed by the process execution unit until the error has occurred,
  wherein
    the process execution unit executes the second process based on the information relating to the second process generated by the process generation unit when the error has occurred during the execution of the first process to undo the processing result of the first process at a designated storage destination until the error occurred, and
    the process generation unit
      refers to flow progress information including information relating to processes of the first process that have been executed and successively acquires processes that have been executed before the error has occurred in the execution of the first process, and
      refers to rollback process information for rolling back a processing result of each of the processes of the first process that have been executed to a state before execution of the first process, and acquires corresponding rollback processes in a reverse order from an order in which the processes were acquired to generate a second process.

2. The information processing system according to claim 1, wherein
  the process execution unit includes a plurality of components, which are each configured to execute a predetermined process with respect to electronic data; and
  the process execution unit executes the first process by combining a first component with at least a second component from among the plurality of components.

3. The information processing system according to claim 2, wherein execution of the program further causes the processor to implement the functions of:
  a second storage unit configured to store process content of the first component and process content of a second component in association with each other, the second component being configured to execute a restoration process of rolling back a processing result of a process executed by the first component.

4. The information processing system according to claim 1, wherein the information relating to electronic data generated using the device is at least one of a filename or a designated destination folder at the designated storage destination.

5. The information processing system according to claim 1, wherein the process execution unit executes the second process after a predetermined period of time has elapsed after the occurrence of the error.

6. The information processing system according to claim 1, wherein the information processing system further comprises:
  a display control unit that displays a screen for enabling a user to select a rollback process from among the rollback processes.

7. An information processing apparatus comprising:
  a first storage unit configured to store, with respect to an application for executing a first process corresponding to a series of processes using electronic data, application identification information that identifies the application in association with information relating to the first process;
  a receiving unit configured to receive a request from a device connected to the information processing system, the request including the application identification information and information relating to electronic data generated using the device;
  a process execution unit configured to execute the first process based on the information relating to the first process stored in the first storage unit in association with the application identification information that is included in the request received by the receiving unit, the process execution unit executing the first process with respect to generated electronic data based on the information relating to the generated electronic data that is included in the request; and
  a process generation unit configured to generate information relating to a second process when an error has occurred during execution of the first process executed by the process execution unit, the second process corresponding to a series of rollback processes for rolling back a processing result of the first process executed by the process execution unit until the error has occurred,
  wherein
    the process execution unit executes the second process based on the information relating to the second process generated by the process generation unit when the error has occurred during the execution of the first process to undo the processing result of the first process at a designated storage destination until the error occurred, and the process generation unit refers to flow progress information including information relating to processes of the first process that have been executed and successively acquires processes that have been executed before the error has occurred in the execution of the first process, and refers to rollback process information for rolling back a processing result of each of the processes of the first process that have been executed to a state before execution of the first process, and acquires corresponding rollback processes in a reverse order from an order in which the processes were acquired to generate a second process.

8. The information processing apparatus according to claim 7, wherein the process execution unit includes a plurality of components, which are each configured to execute a predetermined process with respect to electronic data; and the process execution unit executes the first process by combining a first component with at least a second component from among the plurality of components.

9. The information processing apparatus according to claim 8, further comprising:

a second storage unit configured to store process content of the first component and process content of a second component in association with each other, the second component being configured to execute a restoration process of rolling back a processing result of a process executed by the first component.

10. The information processing apparatus according to claim 7, wherein the process execution unit acquires flow progress information, which relates to the first process of the series of processes that has been executed, from a first component that has executed the first process; and the process generation unit generates the second process based on the acquired flow progress information, the second process including a second component configured to execute a process of rolling back the processing result of the first process, executed by the first component before the occurrence of the error, to a state before the first process was executed.

11. The information processing apparatus according to claim 7, wherein the information relating to electronic data generated using the device is at least one of a filename or a designated destination folder at the designated storage destination.

12. The information processing apparatus according to claim 7, wherein the process execution unit executes the second process after a predetermined period of time has elapsed after the occurrence of the error.

13. The information processing apparatus according to claim 7, wherein the information processing apparatus further comprises:

a display control unit that displays a screen for enabling a user to select a rollback process from among the rollback processes.

14. An information processing method implemented by an information processing system including a first storage unit configured to store, with respect to an application for executing a first process corresponding to a series of processes using electronic data, application identification information that identifies the application in association with information relating to the first process, the information processing method comprising:

a receiving step of receiving a request from a device connected to the information processing system, the request including the application identification information and information relating to electronic data generated using the device;

a process execution step of executing the first process based on the information relating to the first process stored in the first storage unit in association with the application identification information that is included in the request received in the receiving step, the process execution step executing the first process with respect to generated electronic data based on the information relating to the generated electronic data that is included in the request; and a process generation step of generating information relating to a second process when an error has occurred during execution of the first process executed in the process execution step, the second process corresponding to a series of rollback processes for rolling back a processing result of the first process executed in the process execution step until the error has occurred, wherein the process execution step includes executing the second process based on the information relating to the second process generated in the process generation step when the error has occurred during the execution of the first process to undo the processing result of the first process at a designated storage destination until the error occurred, and the process generation unit refers to flow progress information including information relating to processes of the first process that have been executed and successively acquires processes that have been executed before the error has occurred in the execution of the first process, and refers to rollback process information for rolling back a processing result of each of the processes of the first process that have been executed to a state before execution of the first process, and acquires corresponding rollback processes in a reverse order from an order in which the processes were acquired to generate a second process.

15. The information processing method according to claim 14, further comprising:

an acquiring step of acquiring flow progress information, which relates to the first process of the series of processes that has been executed, from a first component that has executed the first process, wherein the second process is generated based on the acquired flow progress information and includes a second component configured to execute a process of rolling back the processing result of the first process, executed by the first component before the occurrence of the error, to a state before the first process was executed.

16. The information processing method according to claim 14, wherein the information relating to electronic data generated using the device is at least one of a filename or a designated destination folder at the designated storage destination.

17. The information processing method according to claim 14, wherein the second process is executed when a predetermined period of time has elapsed after occurrence of the error.

18. The information processing method according to claim 14, wherein
the information processing system further includes a display control unit that displays a screen through which a user selects a rollback process from among the rollback processes, and the information processing method further comprises:
a rollback processes receiving step of receiving the rollback process selected by the user via the display control unit.

* * * * *